(12) United States Patent
Takeyama

(10) Patent No.: US 8,553,318 B2
(45) Date of Patent: Oct. 8, 2013

(54) OPTICAL AMPLIFYING DEVICE, GAIN CONTROL METHOD, OPTICAL TRANSMISSION DEVICE, AND GAIN CONTROL DEVICE

(75) Inventor: Tomoaki Takeyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 448 days.

(21) Appl. No.: 13/042,545

(22) Filed: Mar. 8, 2011

(65) Prior Publication Data

US 2011/0228381 A1    Sep. 22, 2011

(30) Foreign Application Priority Data

Mar. 19, 2010   (JP) .................................. 2010-63704

(51) Int. Cl.
| | |
|---|---|
| H01S 3/067 | (2006.01) |
| H01S 3/10 | (2006.01) |
| H01S 3/13 | (2006.01) |
| H04B 10/29 | (2013.01) |
| H04B 10/079 | (2013.01) |
| H04B 10/294 | (2013.01) |

(52) U.S. Cl.
CPC .......... H01S 3/10015 (2013.01); H01S 3/1301 (2013.01); *H01S 2301/06* (2013.01); H04B 10/07955 (2013.01); H04B 10/2942 (2013.01); H01S 3/06754 (2013.01)
USPC .................................. 359/337.1; 359/341.41

(58) Field of Classification Search
USPC .................................................. 359/333–349
See application file for complete search history.

(56) References Cited

U.S. PATENT DOCUMENTS

| | | | | |
|---|---|---|---|---|
| 7,236,294 | B2 * | 6/2007 | Takeyama et al. ............. | 359/337 |
| 7,616,848 | B2 | 11/2009 | Takeyama et al. | |
| 7,843,631 | B2 * | 11/2010 | Onaka et al. ............. | 359/341.41 |
| 2005/0146782 | A1 * | 7/2005 | Takeyama et al. .......... | 359/337.1 |
| 2008/0080865 | A1 * | 4/2008 | Muro et al. ...................... | 398/83 |
| 2008/0226291 | A1 * | 9/2008 | Onaka .............................. | 398/34 |
| 2008/0239469 | A1 * | 10/2008 | Onaka et al. ................... | 359/337 |
| 2009/0091819 | A1 * | 4/2009 | Bolshtyansky et al. ........ | 359/334 |

FOREIGN PATENT DOCUMENTS

| | | |
|---|---|---|
| JP | 11-112434 A | 4/1999 |
| JP | 2001-352119 A | 12/2001 |
| JP | 2007-274545 A | 10/2007 |

* cited by examiner

*Primary Examiner* — Mark Hellner
*Assistant Examiner* — Ari M Diacou
(74) *Attorney, Agent, or Firm* — Fujitsu Patent Center

(57) ABSTRACT

An apparatus includes: an optical amplifier configured to perform optical amplification for gain by controlling so as to be a target gain; a correction power calculator configured to calculate, in response to amplified spontaneous emission light input to the optical amplifier, correction power corresponding to an amount of gain depression in a bandwidth in which spectral hole-burning occurs in the optical amplifier; and a gain controller configured to calculate, using the correction power calculated in the correction power calculator, a gain for controlling the optical amplification performed in the optical amplifier and perform, using the calculated gain, a control operation so that the gain of the optical amplification becomes the target gain.

14 Claims, 28 Drawing Sheets

OPTICAL AMPLIFYING DEVICE, GAIN CONTROL METHOD, OPTICAL TRANSMISSION DEVICE, AND GAIN CONTROL DEVICE

CROSS-REFERENCE TO RELATED APPLICATIONS

This application is based upon and claims the benefit of priority of the prior Japanese Patent Application No. 2010-063704, filed on Mar. 19, 2010, the entire contents of which are incorporated herein by reference.

FIELD

The embodiments described herein relate to an optical amplifying device, a gain control method, an optical transmission device, and a gain control device, and are used, for example, in optical communication fields.

BACKGROUND

Demand for communication traffic has dramatically increased with the progress of multimedia networks. Optical transmission devices, which multi-relay-amplify optical signals using optical amplifiers that use erbium doped fibers (EDFs) as amplification media, play a great role in marketizing such communication traffic.

For example, in an optical communication system, a transmitting end wavelength-multiplexes and outputs optical signals that have a plurality of wavelengths, and the output wavelength-multiplexed optical signal is propagated through a transmission path. For example, in the transmission path, optical amplifiers are inserted and disposed at regular intervals, and hence the loss of the transmission path is compensated. It may be assumed that the number of signal wavelengths of the optical signal propagated through the transmission path and the wavelength allocation of the optical signal arbitrarily vary.

In Japanese Laid-open Patent Publication No. 11-112434 and Japanese Laid-open Patent Publication No. 2001-352119, examples of the configurations of optical amplifiers used in such an optical transmission system as described above are disclosed. When amplifying a signal light, an EDF generates amplified spontaneous emission (ASE). When the number of signal wavelengths is small, e.g., one wave is used, the amount of ASE power included in output power becomes measurable at the time of the control of optical amplification.

As exemplified in Japanese Laid-open Patent Publication No. 11-112434, previously, constant gain control for the EDF has been performed in view of the ASE power generated in the EDF. For example, prepared information of the ASE power generated in an optical amplifier is introduced as a correction term used at the time of gain calculation. In addition, a signal gain is detected on the basis of monitoring values of input power and output power and the above-mentioned correction term, and hence constant gain control is performed.

Incidentally, in recent years, a transmission distance per one span has been increasing, and the output level of an optical amplifier has been rising. When the output level of the optical amplifier rises, a physical phenomenon called spectral hole-burning (SHB) occurs in the EDF. When the SHB occurs, a phenomenon in which only a gain in the vicinity of a signal wavelength is depressed appears. When the number of signal wavelengths for which ASE correction is most important is small, the phenomenon may become pronounced.

In addition, in an optical amplifier under the constant gain control, the phenomenon of gain depression due to the SHB produces a different effect on the optical amplification of an optical signal wavelength when ASE is mixed with an optical signal in input light or when ASE is not mixed.

In the related art, while the amount of ASE power generated in an amplifier itself is subtracted at the time of constant gain control and hence the realization of high accuracy is secured, the constant gain control has not been coupled with the amount of gain depression due to the SHB the effect of which differs in response to ASE included in input light.

In the optical communication system, it may be assumed that, in an optical amplifier disposed on an upstream side near a transmitting end, the amount of ASE mixed in an optical signal is small, and the amount of gain depression is relatively small. However, it may be assumed that, in an optical amplifier disposed on a downstream side, the amount of ASE mixed in an optical signal becomes large, and the amount of gain depression also becomes large. Therefore, it may be assumed that the level of the optical signal does not reach a target level.

SUMMARY

According to an aspect of the invention, an optical amplifying device includes: an optical amplifier configured to perform optical amplification for gain by controlling so as to be a target gain; a correction power calculator configured to calculate, in response to amplified spontaneous emission light input to the optical amplifier, correction power corresponding to an amount of gain depression in a bandwidth in which spectral hole-burning occurs in the optical amplifier; and a gain controller configured to calculate, using the correction power calculated in the correction power calculator, a gain for controlling the optical amplification performed in the optical amplifier and perform, using the calculated gain, a control operation so that the gain of the optical amplification becomes the target gain.

The object and advantages of the various embodiments will be realized and attained by at least the features, elements and combinations particularly pointed out in the claims.

It is to be understood that both the foregoing general description and the following detailed description are exemplary and explanatory and are not restrictive of the various embodiments.

DESCRIPTION OF EMBODIMENTS

The embodiments will be described with reference to figures, hereinafter. In this regard, however, the embodiments described hereinafter are just exemplifications, and the applications of various modifications and various techniques, not illustrated hereinafter, are not intended to be excluded. Namely, it may be understood that various modifications according to the present embodiments may be implemented insofar as they are within the scope of the present embodiments.

Figure 1:
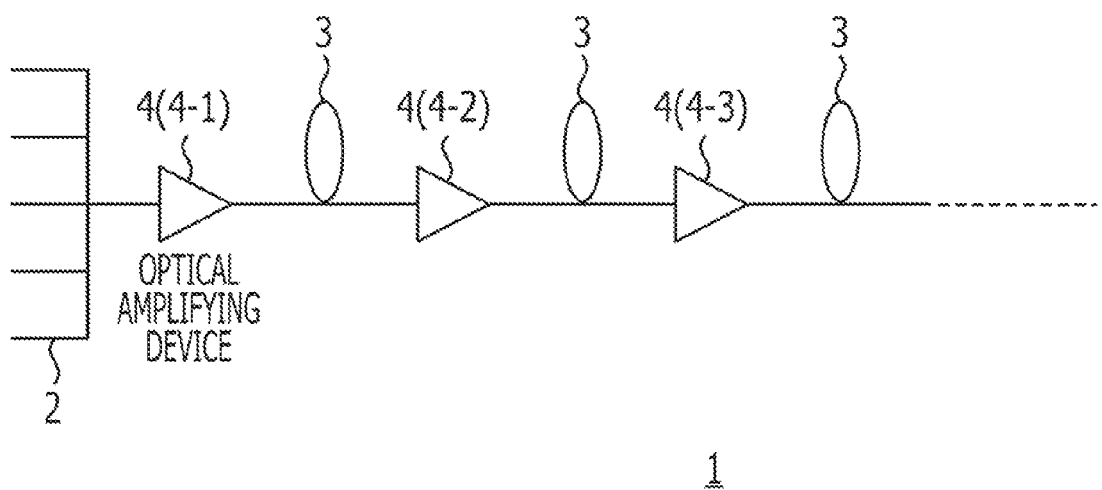
FIG. 1 illustrates an exemplification of an optical communication system in an embodiment.

FIG. 1 is a diagram exemplifying an optical communication system in an embodiment. Optical signals that have a plurality of wavelengths are wavelength-multiplexed in a multiplexer 2 provided in a transmitting end and output, and the output wavelength-multiplexed optical signal is propagated through a transmission path 3. It may be assumed that the exemplified optical communication system 1 is a wavelength division multiplexing (WDM) system in which the maximum number of wavelengths is 40 waves and a signal light wavelength bandwidth is from 1531.9 nm to 1563 nm, for example.

Figure 2:
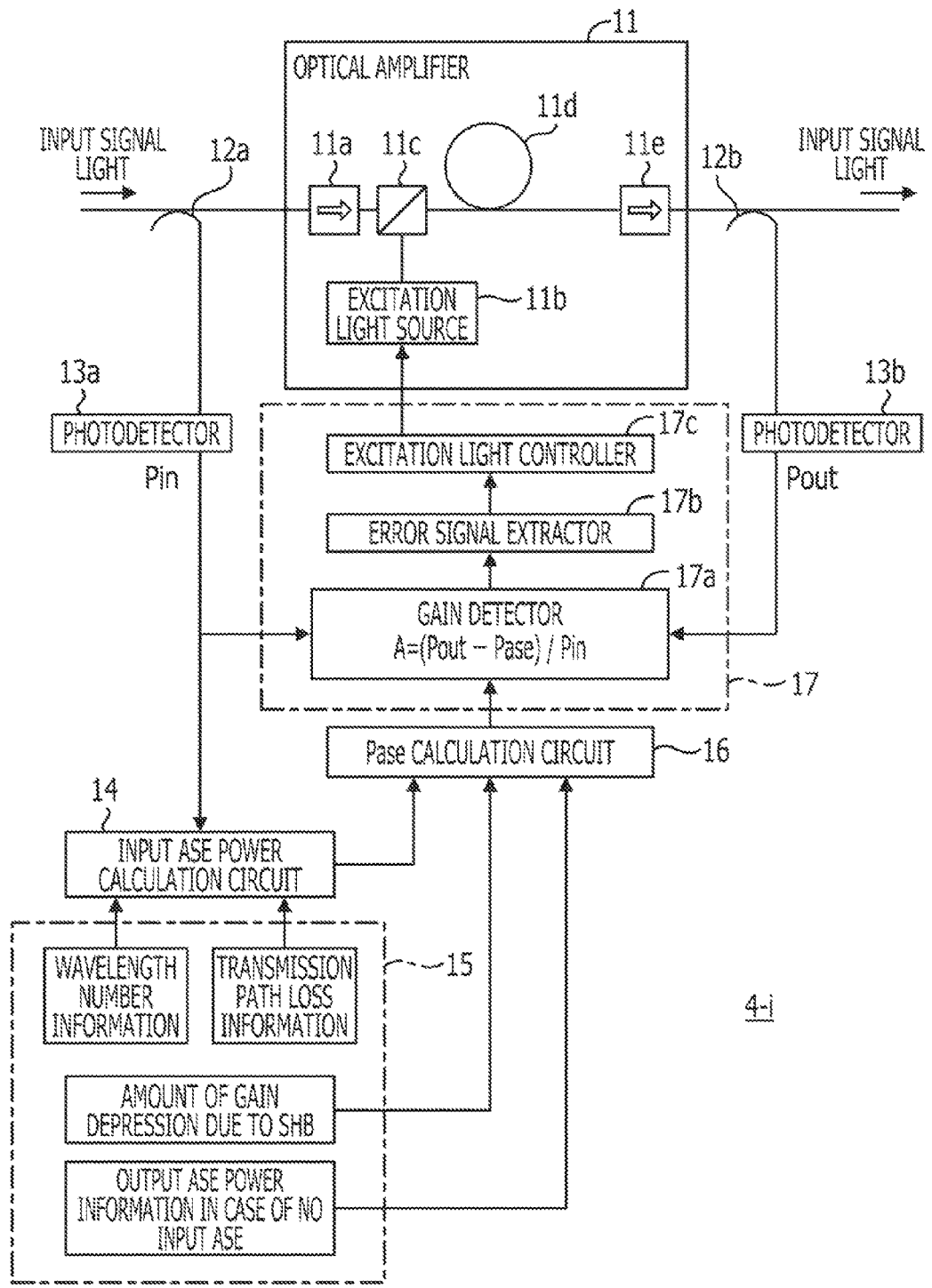
FIG. 2 illustrates an optical amplifying device in an embodiment.

In addition, an optical amplifying device 4 (4-$i$. $i$=1, 2, or 3 in FIG. 1) may be included in the transmission path 3. The optical amplifying device 4-$i$ compensates for an optical signal loss due to the propagation on the transmission path 3. FIG. 2 is a diagram illustrating an example of the configuration of one optical amplifying device 4-$i$ described above. The optical amplifying device 4-$i$ exemplified in FIG. 2 includes an optical amplifier 11, optical splitters 12$a$ and 12$b$, photodetectors 13$a$ and 13$b$, an input ASE power calculation circuit 14, a memory 15, a correction power calculation circuit 16, and a controller 17.

The optical splitter 12$a$ branches light (input light) input from the transmission path 3 on the transmitting side. One of the branches is led to the optical amplifier 11, and the other is led to the photodetector 13$a$. The optical splitter 12$b$ branches output light, optically amplified in the optical amplifier 11 and output, and leads one branched light to the transmission path 3 on the output side while leading the other branched light to the photodetector 13$b$.

The optical amplifier 11 optically amplifies input light input through the optical splitters 12$a$ such as an optical splitter or the like. Therefore, the optical amplifier 11 includes an optical isolator 11$a$, an excitation light source 11$b$, a beam combiner 11$c$, an EDF 11$d$, and an optical isolator 11$e$. Generally an optical coupler may be as the optical splitter. In addition, while a 3 dB coupler, a polarized wave synthesis coupler, or a WDM coupler may be used as the light combiner, it is desirable to use the WDM coupler as the light combiner. In some cases, these couplers are collectively called couplers. It is desirable to use a semiconductor laser as the excitation light source 11$b$.

The optical isolator 11$a$ substantially prevents light reflection from the optical amplifier 11 to the optical coupler 12$a$ side, and the optical isolator 11$e$ substantially prevents light input from the output side (optical coupler 12$b$) to the EDF 11$d$. The excitation light source 11$b$ outputs excitation light to the EDF 11$d$. A WDM multiplexer or the like may be used as the beam combiner 11$c$, and the beam combiner 11$c$ leads excitation light from the excitation light source 11$b$ to the EDF 11$d$ along with input signal light. Accordingly, in the EDF 11$d$, the input light is optically amplified and output through the optical isolator 11$e$.

In addition, the photodetector 13$a$ detects optical power Pin from the input light branched by the optical splitter 12$a$, and outputs the detection result to the controller 17 and the input ASE power calculation circuit 14. The photodetector 13$b$ detects optical power Pout from the output light branched by the optical splitter 12$b$ such as an optical coupler or the like, and outputs the detection result to the controller 17. The memory 15 stores therein information to be used for calculation performed in the input ASE power calculation circuit 14 and the correction power calculation circuit 16, described later.

Furthermore, the input ASE power calculation circuit 14 calculates the power Pin_ase of ASE light included in the input light, on the basis of the input light power detected in the photodetector 13$a$ and a content stored in the memory 15. For example, using wavelength number information of a wavelength-multiplexed optical signal included in the input light, stored in the memory 15, and transmission path loss information of the upstream side transmission path 3 situated nearby, the ASE light power described above is calculated in accordance with a method described later.

In addition, an example of another calculation method will also be disclosed in another embodiment. In addition, the upstream side transmission path 3 situated nearby is a connected transmitting side transmission path in which no optical amplifying device is inserted and disposed, and, for example, corresponds to a transmission path located between the optical amplifying devices 4-1 and 4-2, with respect to the optical amplifying device 4-2 illustrated in FIG. 1.

Using the calculation result of Pin_ase in the input ASE power calculation circuit 14 described above and information stored in the memory 15, the correction power calculation circuit (correction power calculator) 16 calculates a correction value used when a gain is calculated at the time of constant gain control. The correction value is a correction value (correction power: Pase) relating to the ASE light power at the time of the derivation of a signal gain, and, as described later, is a value that includes, as a component, a gain error occurring when the ASE light is included, in addition to signal light, in the input light to the EDF 11d.

Using the correction power Pase calculated in the correction power calculation circuit 16, the controller (gain controller) 17 calculates a gain used for the constant gain control, and, by performing feedback control on excitation light power, realizes a control operation in which a gain used for the optical amplification of the signal light performed in the optical amplifier 11 is maintained substantially constant. Therefore, the controller 17 includes a gain detector 17a, an error signal extractor 17b, and an excitation light controller 17c.

Using, pieces of information Pin and Pout of optical power detected in the photodetectors 13a and 13b and the correction value Pase calculated in the correction power calculation circuit 16, the gain detector 17a detects (calculates) the value of a signal gain for constant gain control based on feedback. For example, the value A of the signal gain is calculated in accordance with the Expression (1).

$$A=(Pout-Pase)/Pin \quad (1)$$

The error signal extractor 17b extracts or generates a signal (error signal) that corresponds to an error (difference) between the value A of the signal gain, calculated in the gain detector 17a, and the value of a target gain. In addition, in response to the error signal extracted or generated in the error signal extractor 17b, the excitation light controller 17c performs, through controlling excitation light power from the excitation light source 11b in the optical amplifier 11, optical amplification control in such a direction that the error signal becomes zero.

Accordingly, using the correction power calculation circuit 16 and the controller 17, described above, as elements, a gain control device may be configured that performs at the target gain the control of optical amplification in the optical amplifier 11.

In the optical amplifying device 4-i configured as described above, a substantially constant gain control operation is performed focusing on the optical power of a signal light component. Specifically, in the input ASE power calculation circuit 14, the power Pin_ase of ASE light included in the input light to the optical amplifier 11 is calculated. In addition, in the correction power calculation circuit 16, using the calculation result of the input ASE power calculation circuit 14, the correction power Pase at the time of the calculation of a gain used for the substantially constant gain control is calculated.

In the controller 17, using the correction power calculated in the correction power calculation circuit 16, a gain for the substantially constant gain control is calculated, and using the calculated gain A, a control operation is performed so that optical amplification at the target gain is carried out. Specifically, the excitation light to the excitation light source 11b is controlled (for example, the excitation light power is controlled) in such a direction that a difference between the target gain and the calculated gain becomes substantially zero.

At this time, since the substantially constant gain control is performed in the controller 17 on the basis of the gain value obtained using the correction power calculated in the correction power calculation circuit 16, the accuracy of control may be improved, compared with a case in which the substantially constant gain control is performed using a gain value obtained without the above-mentioned correction power.

Here, a reason why the accuracy of the substantially constant gain control may be improved using the correction power calculated in the correction power calculation circuit 16 in the optical amplifying device 4-i will be described. First, it is assumed that, in an optical amplifying device, a gain value is calculated without using the correction power calculated in the correction power calculation circuit 16 and then substantially constant gain control is performed. Here, it is assumed that, in the optical amplifying device, the maximum number of wavelengths is 40 waves and a signal light wavelength bandwidth is from 1531.9 nm to 1563 nm, for example.

Figure 3:
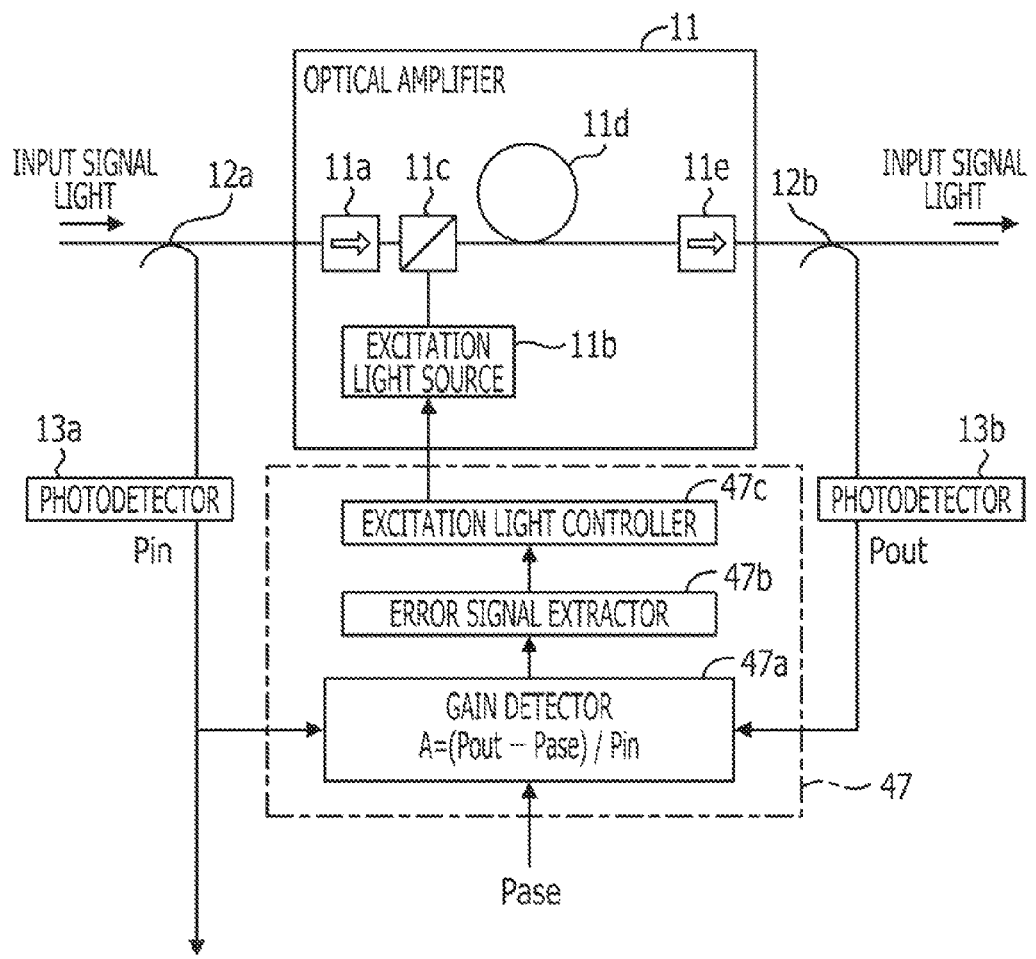
FIG. 3 illustrates an optical amplifying device as a comparison example.

In this example case, like an optical amplifying device 40 exemplified in FIG. 3, the input ASE power calculation circuit 14 may be omitted in addition to the correction power calculation circuit 16 in the optical amplifying device 4-i illustrated in FIG. 2. In addition, in the controller 47, gain calculation may also be performed using input light power and output light power calculated in the photodetectors 13a and 13b, respectively, and, for example, the power PASE of the output ASE light when no ASE light is included in the input light.

Namely, in a gain detector 47a in the controller 47, the power PASE of the output ASE light when no ASE light is included in the input light is subtracted from the detected output light power Pout, and the ratio of the value obtained from the subtraction to the input light power Pin is obtained as a signal gain. Accordingly, since a gain is calculated in the absence of the ASE light occurring in the EDF, the accuracy of the derivation of a gain used for signal optical amplification in which input-output monitoring values are used is substantially improved, compared with a case in which the component of the ASE light power is not used for the derivation of a gain.

In addition, an error signal extractor 47b and an excitation light controller 47c operate in the same way as above-mentioned portions illustrated in FIG. 2 (symbols 17b and 17c), respectively. Namely, the error signal extractor 47b extracts or generates a signal (error signal) that corresponds to an error (difference) between the value of the signal gain, calculated in the gain detector 47a, and the value of a target gain. In addition, in response to the error signal extracted or generated in the error signal extractor 47b, the excitation light controller 47c performs, through controlling excitation light power from the excitation light source 11b in the optical amplifier 11, optical amplification control in such a direction that the error signal becomes substantially zero.

Figure 4:
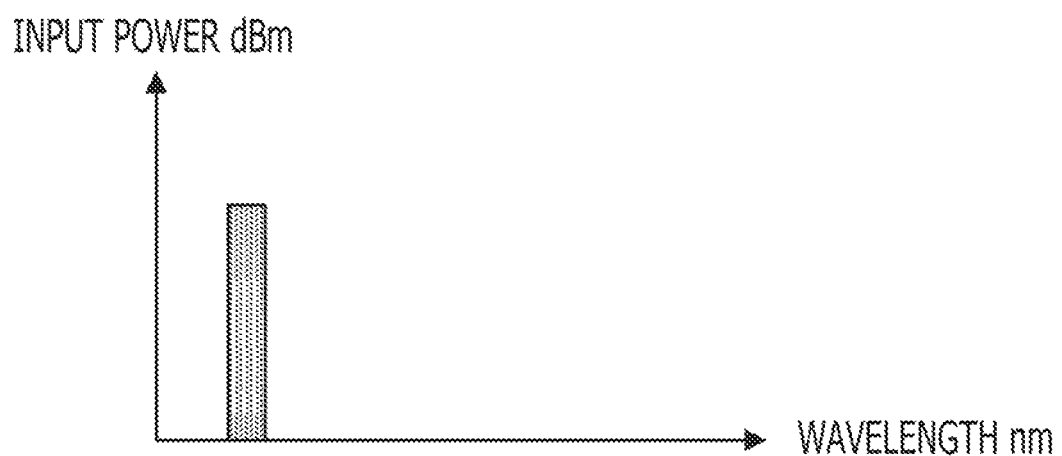
FIG. 4 illustrates an example of a wavelength characteristic of optical power with respect to signal light allocated to one wave of a channel in a short-wavelength band in a signal wavelength.
Figure 5:
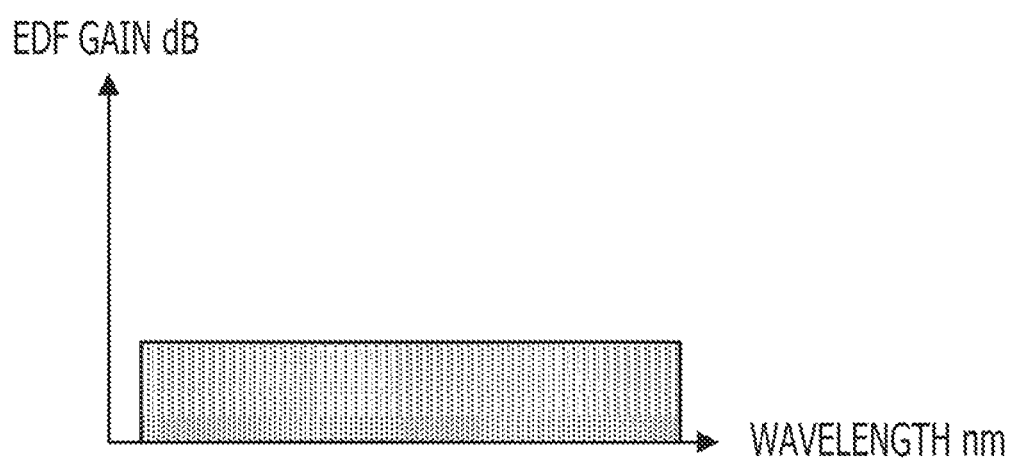
FIG. 5 illustrates an example of a gain-wavelength characteristic of an optical amplifier gain-controlled by a controller.
Figure 6:
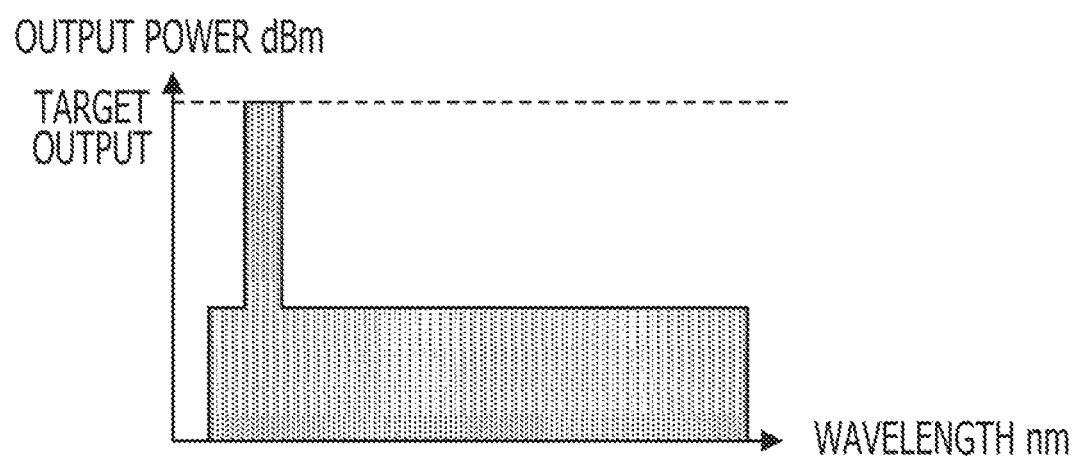
FIG. 6 illustrates an example of a wavelength characteristic of output light power.

Here, in the optical amplifying device 4-1 (refer to FIG. 1) that has the configuration of the optical amplifying device 40, a case will be considered in which signal light that corresponds to one wave of a channel #1 in a short-wavelength band in signal wavelengths as illustrated in FIG. 4 is input. At this time, when no SHB occurs in the EDF 11d, the gain-wavelength characteristic of the optical amplifier 11 gain-controlled by the controller 17 becomes as illustrated in FIG. 5, and the wavelength characteristic of the output light power thereof becomes as illustrated in FIG. 6, for example. In addition, the component of the optical power of a wavelength band other than the wavelength band of the input signal light is the ASE light generated in the EDF 11d.

Figure 7:
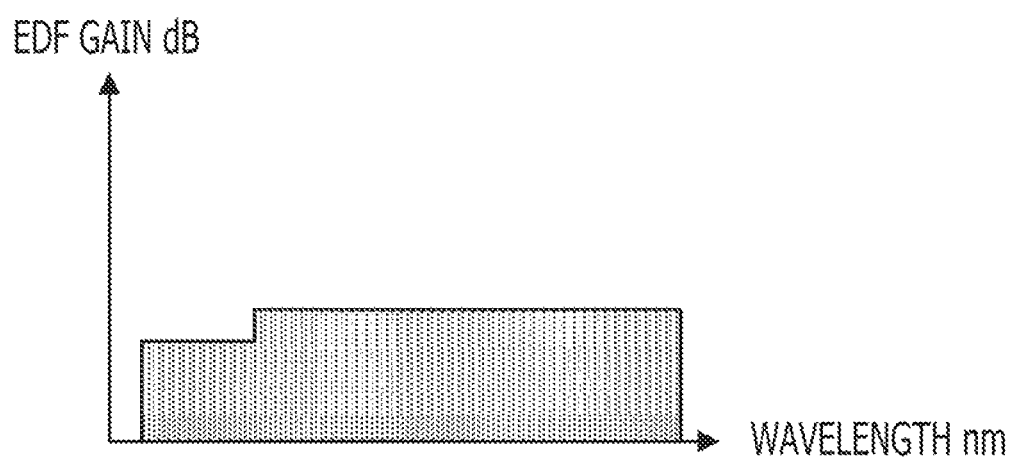
FIG. 7 illustrates an example of a gain-wavelength characteristic of the optical amplifier when SHB occurs in an EDF.
Figure 8:
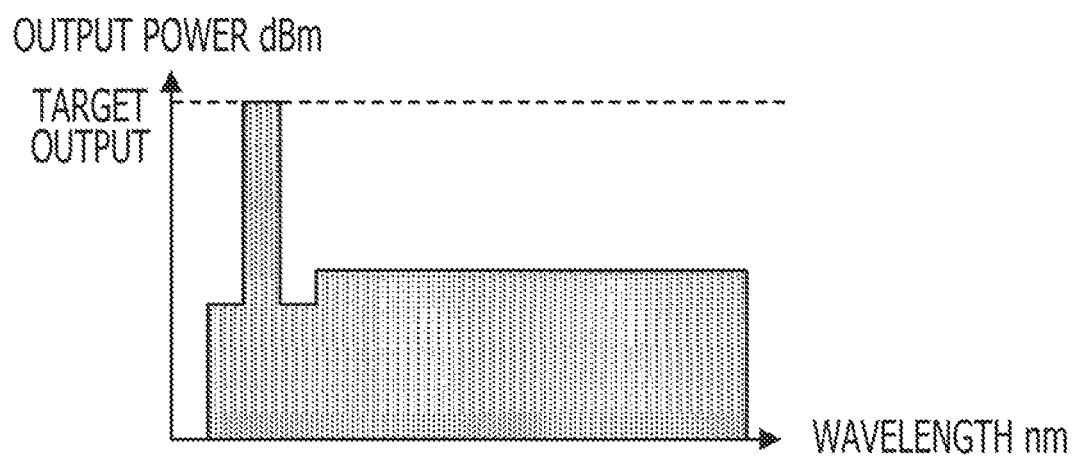
FIG. 8 illustrates an example of a wavelength characteristic of output light power when SHB occurs in an EDF.

On the other hand, when the SHB occurs in the EDF 11d, a gain in the vicinity of a signal wavelength is depressed owing to the SHB. Therefore, the gain-wavelength characteristic of the optical amplifier 11 becomes as illustrated in FIG. 7, and the characteristic of the output light power thereof becomes as illustrated in FIG. 8, for example. Namely, owing to the SHB, more ASE light that has wavelengths other than a wavelength in the vicinity of the signal wavelength occurs. However, if the value of the ASE power is preliminarily obtained by measurement, the output may be set to a target output on the basis of the above-mentioned correction of a calculated gain value using PASE illustrated in FIG. 3. For the reason described above, even if the SHB occurs in the EDF 11d, the output of the optical amplifying device 40 is set to the target output.

Figure 9:
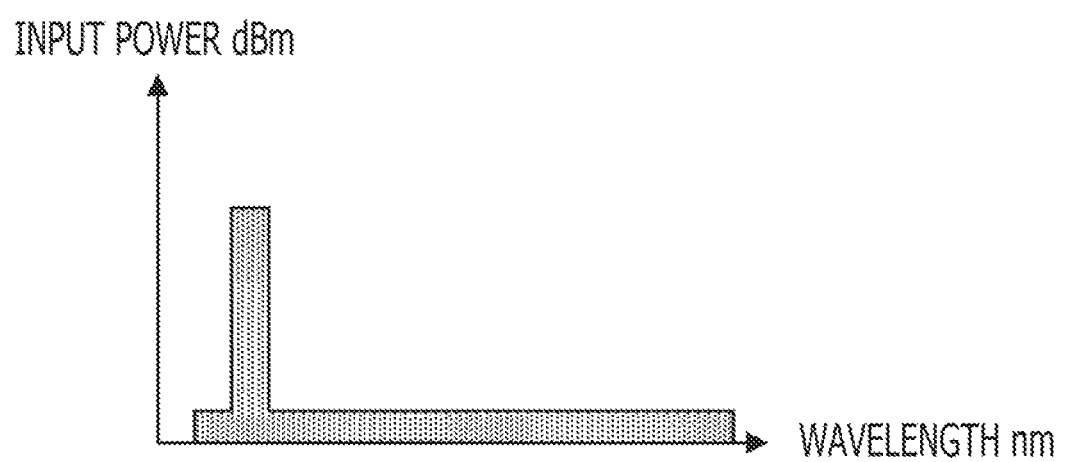
FIG. 9 illustrates an example of a wavelength characteristic of light power of input light to the optical amplifying device.

Next, a case will be described in which the optical amplifying device 4-2 illustrated in FIG. 1 has the configuration of the optical amplifying device 40. As illustrated in FIG. 9, input light to the optical amplifying device 4-2 includes the optical power of ASE light in addition to signal light. Namely, unlike input light to the optical amplifying device 4-1 (refer to FIG. 4), which does not pass through an EDFA or the like, the input light to the optical amplifying device 4-2 includes the ASE light generated in an optical amplifying device 4-1 at the preceding stage.

Figure 10:
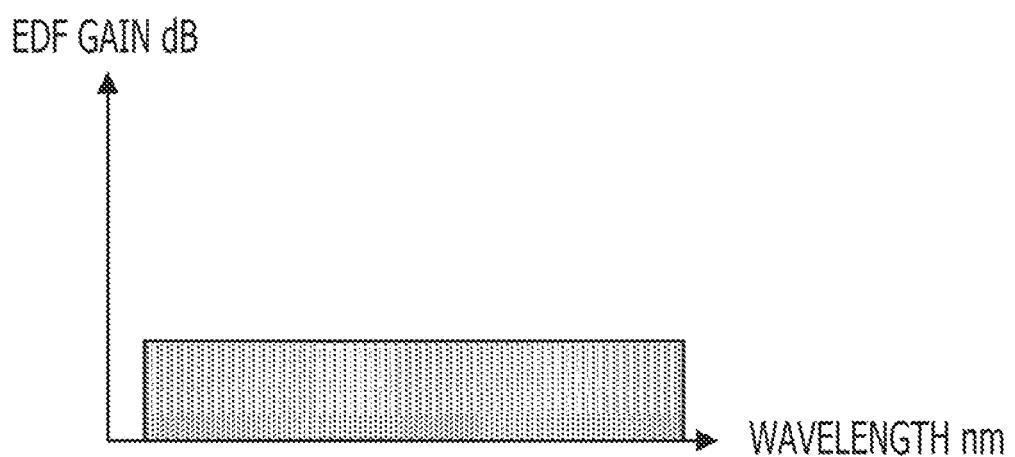
FIG. 10 illustrates an example of a wavelength characteristic of a gain when SHB does not occur in an EDF in the optical amplifying device.
Figure 11:
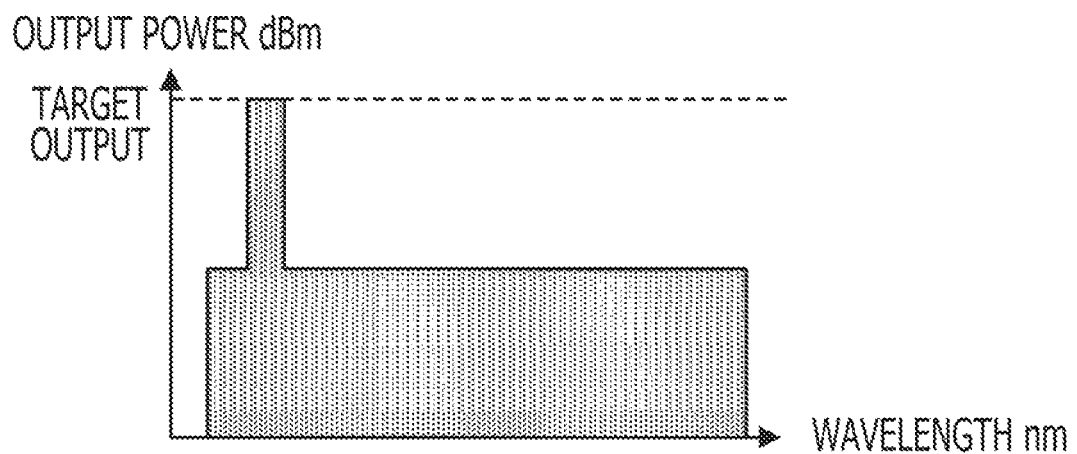
FIG. 11 illustrates an example of a wavelength characteristic of output light power when SHB does not occur in an EDF in the optical amplifying device.

As illustrated in FIG. 9, the ASE light has a wavelength band that covers the entire amplification wavelength band other than a currently operated signal light wavelength band (in this case, a wavelength band other than the channel #1) in the EDF 11d. When no SHB occurs in the EDF 11d in the optical amplifying device 4-2, the wavelength characteristic of a gain becomes as illustrated in FIG. 10, and the wavelength spectrum of output light becomes as illustrated in FIG. 11.

Figure 12:
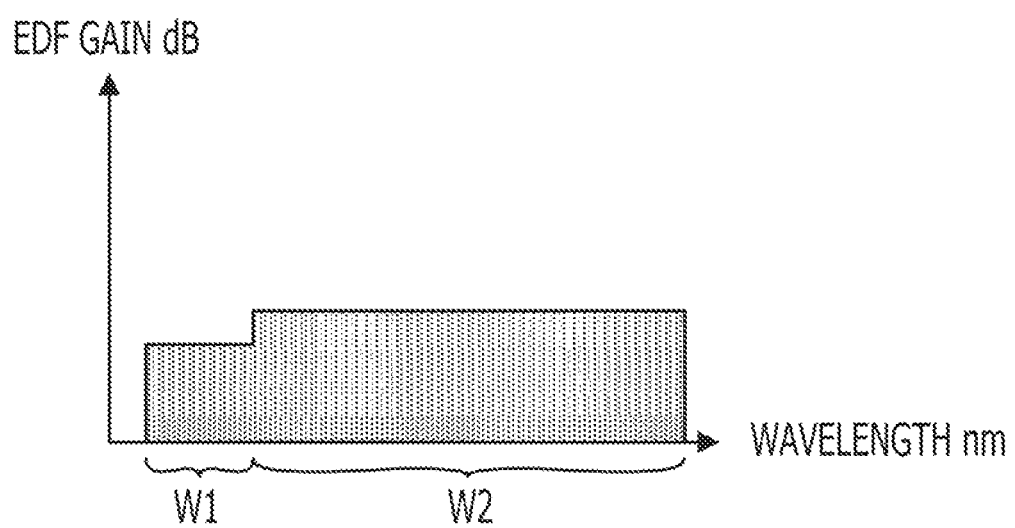
FIG. 12 illustrates an example of a wavelength characteristic of a gain when SHB occurs in an EDF in the optical amplifying device.
Figure 13:
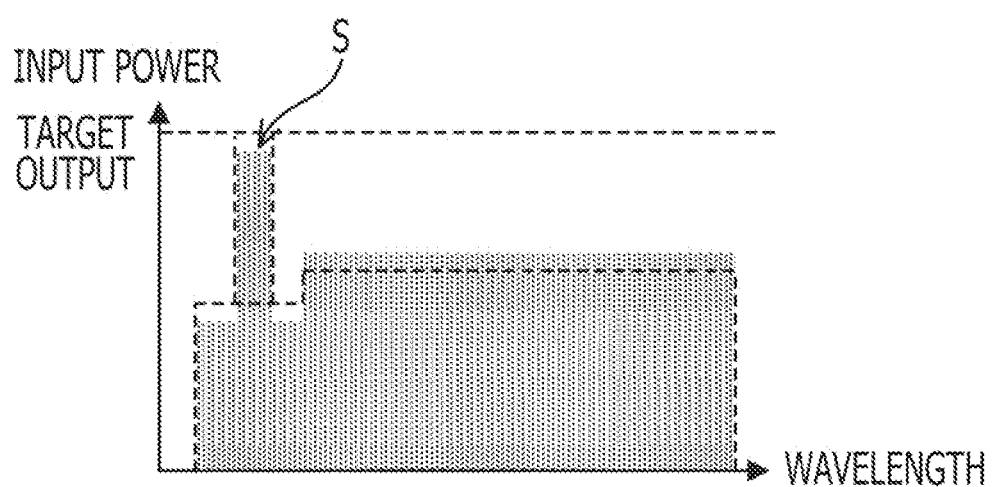
FIG. 13 illustrates an example of a wavelength characteristic of output light power when SHB occurs in an EDF in the optical amplifying device.

On the other hand, when SHB occurs in the EDF 11d in the optical amplifying device 4-2, a gain in the vicinity of the channel #1 is depressed. Therefore, the gain-wavelength characteristic of the EDF 11d becomes as illustrated in FIG. 12, and the wavelength spectrum of output light thereof becomes as illustrated in FIG. 13.

Namely, when the optical amplifying device 4-2 is the optical amplifying device 40 that has the configuration exemplified in FIG. 3, the power Pase of the ASE light included in the output light is preliminarily measured on the condition that no ASE is included in the input light, and the measurement result is retained as power information. In addition, the retained power Pase of the ASE light is subtracted from the detected output light power, and the ratio of the value obtained from the subtraction to the input light power is obtained as a signal gain, thereby calculating the gain of the signal light. In addition, the excitation light to the EDF 11d is controlled so that the calculated gain becomes the target gain.

At this time, when the above-mentioned Pase is used as a correction term at the time of the derivation of a gain, a correction term that corresponds to the effect of SHB, to which the ASE light included in the input light is subject, is not used. Therefore, even if optical amplification is performed on the basis of the gain-wavelength characteristic illustrated in FIG. 12, in some cases, as indicated by "S" in FIG. 13, the output power of the signal light does not reach target power.

Namely, when the excitation light is controlled so that the gain derived using the above-mentioned Pase becomes the target gain, the assumed wavelength characteristic of an output is a wavelength characteristic in which the power of the ASE light at a wavelength other than a wavelength in the vicinity of the signal wavelength becomes high. For example, a wavelength spectrum indicated by a dotted line in FIG. 13 is assumed. However, in an actual wavelength characteristic, as indicated by a filled portion in FIG. 13, ASE power at a wavelength other than a wavelength in the vicinity of the signal wavelength becomes higher than a level assumed in the ASE correction based on the method illustrated in FIG. 3.

This is because a gain that the ASE light included in the input light obtains in the EDF 11d increases and decreases in accordance with a wavelength band owing to SHB. Namely, this is because, while the gains of the signal wavelength band (for example, the channel #1) and a wavelength band in the vicinity thereof (for example, refer to W1 in FIG. 12) decrease, the gain of a wavelength band other than these wavelength bands (a long-wavelength band the wavelength of which is longer than that of the vicinity of the channel #1, for example, refer to W2 in FIG. 12) increases.

Figure 14:
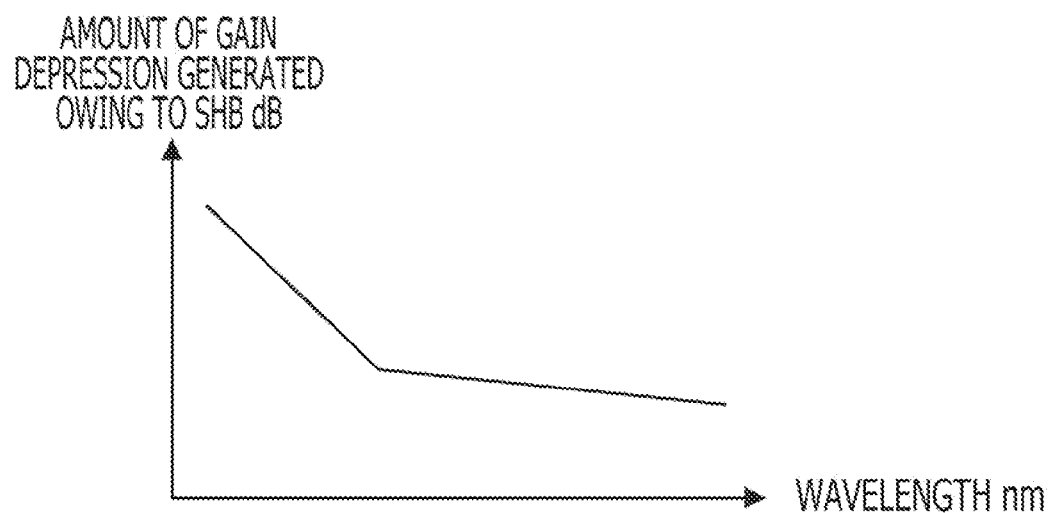
FIG. 14 illustrates an example of a wavelength dependence property of gain depression due to SHB when signal light is allocated.

In addition, FIG. 14 illustrates an example of the wavelength allocation dependence property of the amount of gain depression in the vicinity of the signal light in a one-wave operation, which is due to SHB. As exemplified in FIG. 14, in a case in which a signal light wavelength is allocated on a short wavelength side, the tendency of the signal light to be affected by the gain depression is picked up, compared with a case in which the signal light wavelength is not allocated on the short wavelength side.

In the case exemplified in FIG. 12, while amplification is performed with a lower gain than envisioned, owing to SHB, in the wavelength band W1 to which the signal light is allocated, amplification is performed with a higher gain than envisioned in the wavelength band W2. Therefore, even if the substantially constant gain control is performed with estimating the power of the output ASE light generated in the EDF 11d alone, in some cases, the output power of the signal light does not reach a target, when the signal light is allocated to a wavelength band susceptible to the gain depression due to the SHB.

In other words, a difference in level between the ASE power in the vicinity of the signal and the ASE power in a wavelength band other than the vicinity of the signal turns out to be enlarged, compared with an amount envisioned in the configuration exemplified in FIG. 3 (refer to FIG. 7). In addition, since the ASE power in a wavelength band other than the vicinity of the signal is higher than envisioned, output light in the signal light wavelength band turns out to be lower than a target output regardless of the operation of substantially constant gain control (refer to A in FIG. 13).

When the configuration exemplified in FIG. 3 is also applied to an optical amplifying device (for example, 4-3 illustrated in FIG. 1) located downstream of the optical amplifying device 4-2 in the transmission path 3, the phenomenon in which the signal light output power does not reach the target power with performing the substantially constant gain control occurs in the same way. In particular, in an optical amplifying device on the downstream side, when the ratio of the optical power of the ASE light to the input signal light increases, the amount of output depression due to the SHB also increases.

Accordingly, in the optical amplifying device 4-$i$ illustrated in FIG. 2, an increase in the level of the above-mentioned ASE light included in the input light, which is due to amplification, is introduced as a correction term at the time of the derivation of the optical amplification gain of the signal light. Namely, it is taken into consideration that, with respect to a gain that ASE included in an input obtains, while the gain of a wavelength in the vicinity of the signal wavelength becomes small, the gain of a wavelength other than the vicinity of the signal wavelength becomes great.

Specifically, in the input ASE power calculation circuit 14, the ASE power (Pin_ase) included in the input light is calculated. As an example, using the detection result of the input light power from the photodetector 13$a$ and the number (n) of currently operated signal light wavelengths and the loss information (Loss) of the transmission path 3, stored in the memory 15, the ASE power (Pin_ase) is calculated in accordance with the following Expressions (2) and (3).

$$P\text{in\_ase [mW]} = P\text{in\_total [mW]} - 10^{H/10} \quad (2)$$

$$H = \text{(optical amplifier output level per one wavelength [dBm/ch])} + 10*\log(n) - \text{Loss [dB]} \quad (3)$$

The information stored in the memory 15 may include n, Loss, ΔG, and Pase 0, which are information used for the calculation in the above-mentioned Expressions (2) and (3), target gain information for substantially constant gain control performed in the controller 17, and the like. Here, "n" is information of the number of the currently operated wavelengths of the signal light, and "Loss" is the loss information of the transmission path 3 situated nearby on the upstream side. Furthermore, "ΔG" is information relating to the amount of gain depression at the time of optical amplification performed in the EDF 11$d$ in the corresponding amplifier 11. In addition "Pase 0" is the power information of the ASE light output when there is no ASE in an input, and corresponds to Pase used in the gain detector 47$a$ illustrated in FIG. 3.

In addition, the wavelength number information "n" and the transmission path loss information "Loss" may be obtained from a monitoring signal included in light from an upstream side device (transmitting-side transmission device) and be stored. In addition, "ΔG" and "Pase 0" may be stored in a measurement result preliminarily obtained.

In the correction power calculation circuit 16, as an example, the correction power Pase [milliwatt: mW] is calculated in accordance with Expressions (4) to (6). In addition, in Expression (4), "B" is used for calculating with $10^{B/10}$ (milliwatt) an amount that occurs in an output when the power of the ASE light in an input is optically amplified with a higher gain than a signal gain owing to the effect of SHB. In addition, "C" is used for calculating with $10^{C/10}$ (milliwatt) an amount that occurs in an output when the power of the ASE light in an input is optically amplified with the same gain as the signal gain. In addition, in Expressions (5) and (6), a gain target value corresponds to a value that is a target for the substantially constant gain control performed in the optical amplifier 11. In other words, the correction power calculation circuit 16 is a correction power calculator that calculates, in response to amplified spontaneous emission light input to the optical amplifier 11, correction power corresponding to the amount of gain depression in a bandwidth in which spectral hole-burning occurs in the optical amplifier 11.

$$P\text{ase [mW]} = (P\text{ase 0 [mW]}) + 10^{B/10} - 10^{C/10} \quad (4)$$

$$B = (P\text{in\_ase [dBm]}) + (\text{gain target value [dB]} + \Delta G \text{ [dB]}) \quad (5)$$

$$C = (P\text{in\_ase [dBm]}) + (\text{gain target value [dB]}) \quad (6)$$

Figure 15:
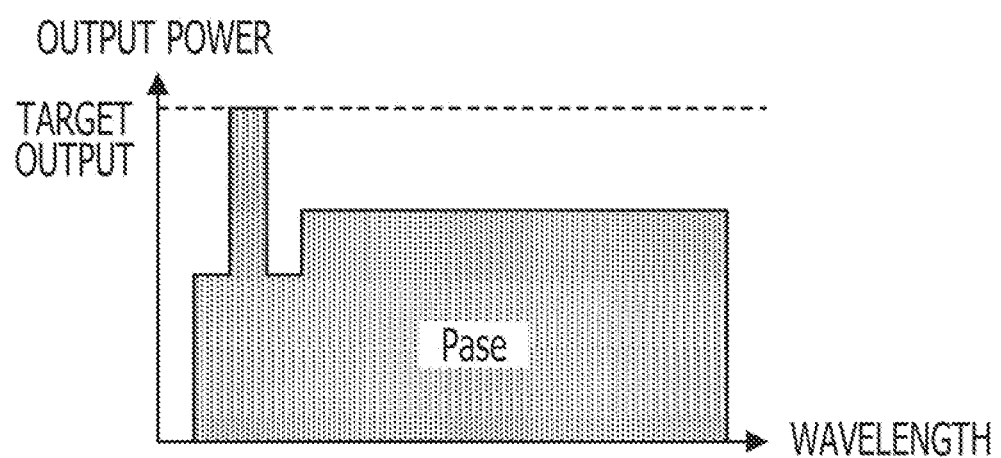
FIG. 15 illustrates a wavelength characteristic of optical power that corresponds to a calculation result of correction power Pase.

As examples, FIGS. 15 to 18 are diagrams illustrating the power information used in Expressions (4) to (6), mentioned above, using wavelength spectra (wavelength characteristics of optical power). Namely, FIG. 15 is a wavelength spectrum corresponding to the calculation result of the correction power Pase. Pase corresponds to the area of a wavelength spectrum distribution exemplified in FIG. 15. In addition, Pase is thought to be ASE light power included in the output light of the optical amplifier 11, which includes, as components, ASE light power input to the optical amplifier 11 and ASE light power excited by the EDF 11$d$ itself in the optical amplifier 11.

Figure 16:
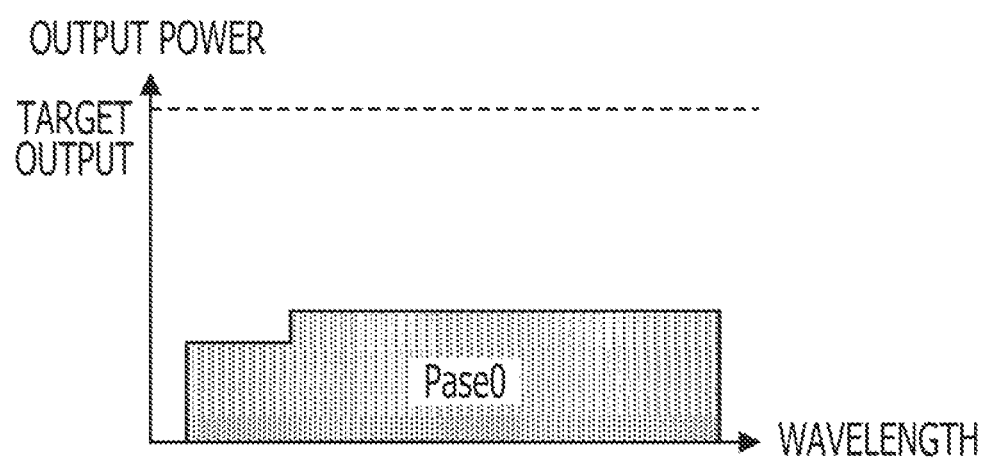
FIG. 16 illustrates an example of a wavelength characteristic of optical power of ASE light output when there is no ASE in an input.
Figure 17:
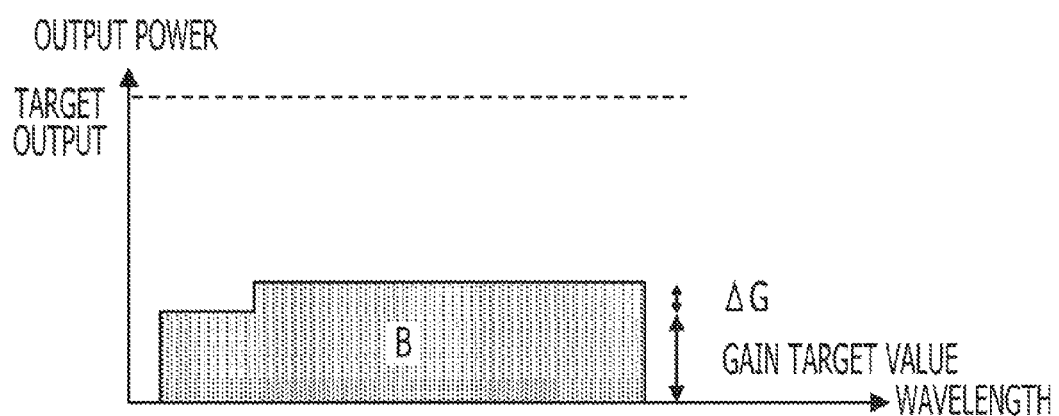
FIG. 17 illustrates an example of a wavelength characteristic of optical power that corresponds to a term B ($10^{B/10}$) in Expression (4).

In addition, the wavelength spectrum of ASE light output when there is no ASE in an input becomes as illustrated in FIG. 16. Namely, the power Pase 0 of the corresponding ASE light corresponds to the area of a wavelength spectrum distribution exemplified in FIG. 16. In addition, when SHB occurs in the EDF 11$d$, the value of the power Pase 0 includes the component thereof.

Furthermore, the term B ($10^{B/10}$) in Expression (4) corresponds to an amount of ASE power included in an output, to which the ASE power in an input is amplified with a gain higher than a signal gain owing to the effect of SHB. Namely, the term B corresponds to ASE light power optically amplified with a gain that is higher than a gain target value by a value corresponding to ΔG, and corresponds to the area of a wavelength spectrum distribution exemplified in FIG. 17. In other words, while the gain of a signal light wavelength band decreases by ΔG under the constant gain control, the ASE light obtains a gain higher than the target gain by ΔG.

In addition, the value of the term B illustrated in Expression (4) is derived as illustrated in Expression (5). In addition, Expression (4) is noted in units of mW (milliwatt), and Expression (5) is noted in units of dB (decibel).

In the correction power calculation circuit 16, using the value of the Pase 0 calculated in the input ASE power calculation circuit 14 and the values of ΔG and a target gain which are stored in the memory 15, B and C are calculated, and Pase is calculated as illustrated in Expression (4). Needless to say, the calculation of Pase may be performed in a form in which the terms B and C are expanded.

Figure 18:
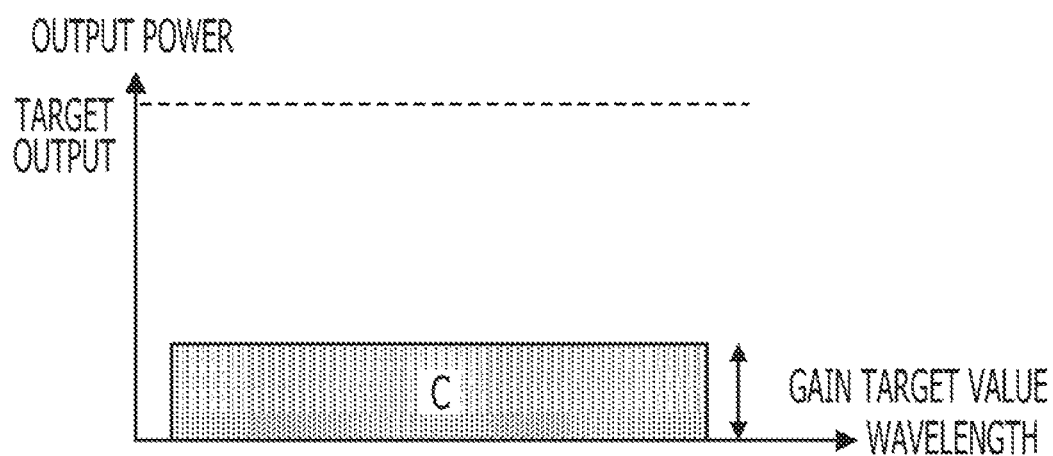
FIG. 18 illustrates an example of a wavelength characteristic of optical power that corresponds to a term C ($10^{C/10}$) in Expression (4).

In addition, as illustrated in Expression (6), the term C ($10^{C/10}$ in Expression (4) corresponds to an amount that occurs in an output when the ASE power obtains the same gain as the signal gain, and corresponds to the area of a wavelength spectrum distribution exemplified in FIG. 18.

In addition, a value obtained by subtracting the term C from the term B illustrated in Expression (4) described above turns out to be the increased amount of ASE power due to SHB. The value is a component that is not introduced at the time of the aforementioned calculation of correction power illustrated in FIG. 3. In other words, the output power correction value Pase is a correction value for output power (due to ASE light) at the time of gain calculation for the constant gain control.

Accordingly, in the gain controller 17, using the correction power Pase calculated in the correction power calculation circuit 16, a signal gain A relating to the gain control performed in the optical amplifier 11 may be calculated, for example, in accordance with Expression (1) described above. In addition, using information of the signal gain A derived with a high degree of accuracy, the controller 17 may control the optical amplifier 11 in the direction toward the target gain.

In this way, since the correction power calculated in the correction power calculation circuit 16 is used, the accuracy of the calculation of the signal gain and the constant gain control performed in the optical amplifying device 4-$i$ illustrated in FIG. 2 may be highly improved, compared with a case in which the correction value Pase (corresponding to Pase 0) illustrated in FIG. 3 is used.

Figure 19:
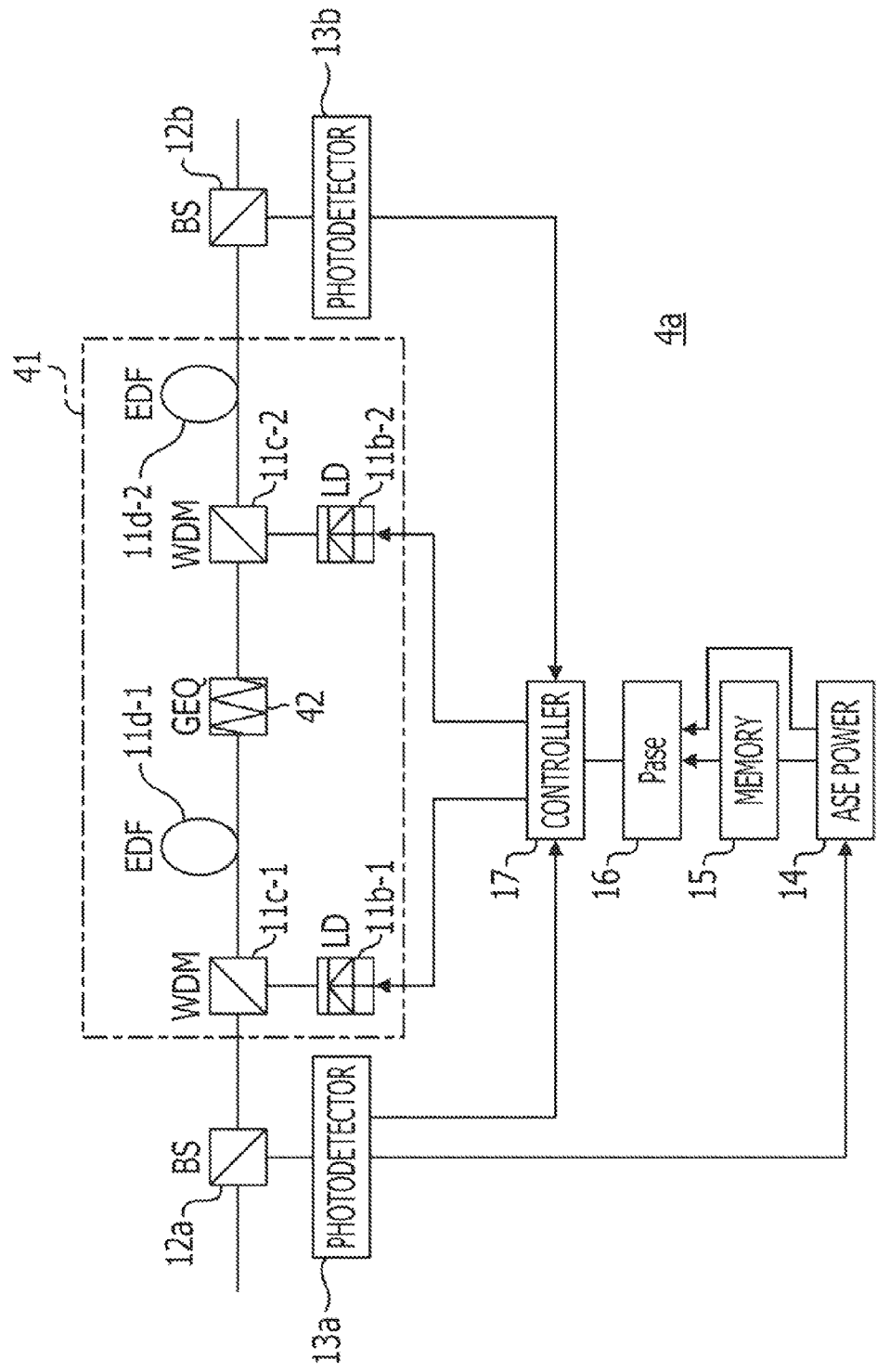
FIG. 19 illustrates a second embodiment of the optical amplifying device.

FIG. 19 is a diagram illustrating a second embodiment of the optical amplifying device 4-$i$ illustrated in FIG. 1. In an optical amplifying device 4$a$ illustrated in FIG. 19, the configuration of the optical amplifier 41 is different from the aforementioned configuration illustrated in FIG. 2. The optical amplifier 41 includes EDFs 11$d$-1 and 11$d$-2, which are two-stage cascade-connected, and excitation light sources 11$b$-1 and 11$b$-2 that generate excitation light for exciting the EDFs 11$d$-1 and 11$d$-2 and supply the excitation light through beam combiners 11$c$-1 and 11$c$-2. Furthermore, the optical amplifier 41 includes a gain equalizer (Gain Equalizer: GEQ) that is disposed between the EDFs 11$d$-1 and 11$d$-2 and used for planarizing the gain-wavelength characteristic of an output signal light. In this case, in the same way as in FIG. 2, the accuracy of the calculation of a signal gain and the constant gain control may also be highly improved.

Figure 20:
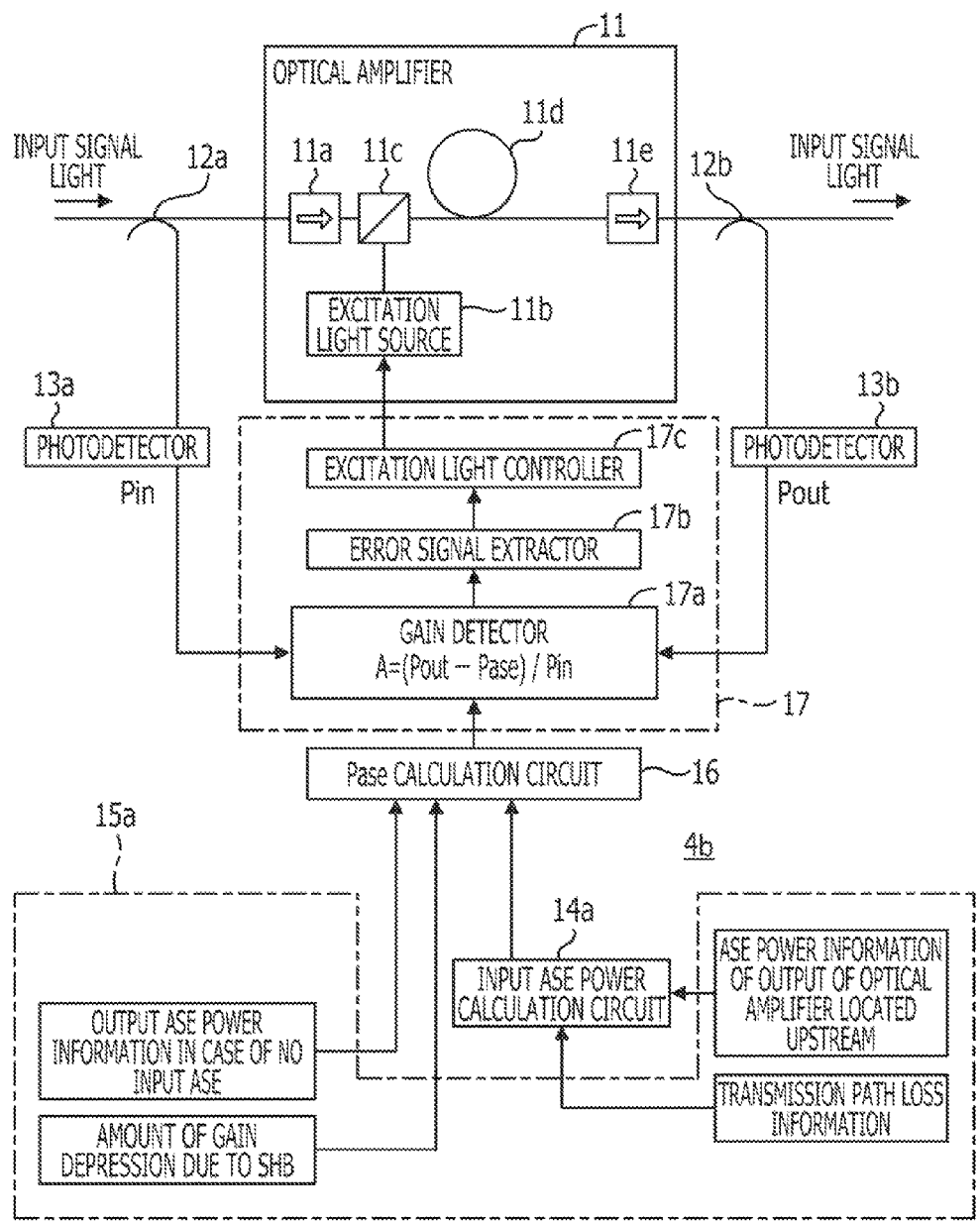
FIG. 20 illustrates a third embodiment of the optical amplifying device.

FIG. 20 is a diagram illustrating a third embodiment of the optical amplifying device 4-$i$ illustrated in FIG. 1. In an optical amplifying device 4$b$ illustrated in FIG. 20, an input ASE power calculation circuit 14$a$ that calculates the ASE power Pin_ase of an input is different from the input ASE power calculation circuit 14 in FIG. 2 described above. In addition, the same symbol as that in FIG. 2 indicates almost the same portion.

Here, as illustrated in Expression (7), the input ASE power calculation circuit 14$a$ calculates Pin_ase by subtracting the loss information of an upstream transmission path from the power information of ASE light at the output of an upstream optical amplifying device.

$$P\text{in\_ase [dBm]} = (\text{upstream optical amplifier output ASE [dBm]}) - (\text{Loss [dB]}) \quad (7)$$

In addition, with respect to the ASE power at the output of the upstream optical amplifying device, the power information of ASE light, attached and transmitted along with a monitoring signal from a device located upstream of a transmission path, may be received and used for a calculation operation performed in the input ASE power calculation circuit 14$a$. In addition, the received ASE power information may be stored in the memory 15. Furthermore, the loss information of an upstream transmission path may also be preliminarily stored in the memory 15.

In the correction power calculation circuit 16, using the ASE power of an input calculated in such a way as described above, the correction power Pase is calculated in the same way as the case described above in FIG. 2, and the controller 17 constant-gain-controls the optical amplifier 11, using the signal gain A obtained with the Pase. Accordingly, in the optical amplifying device 4$b$ illustrated in FIG. 20, the accuracy of the derivation of a signal gain may also be improved, compared with the case in FIG. 3.

Figure 21:
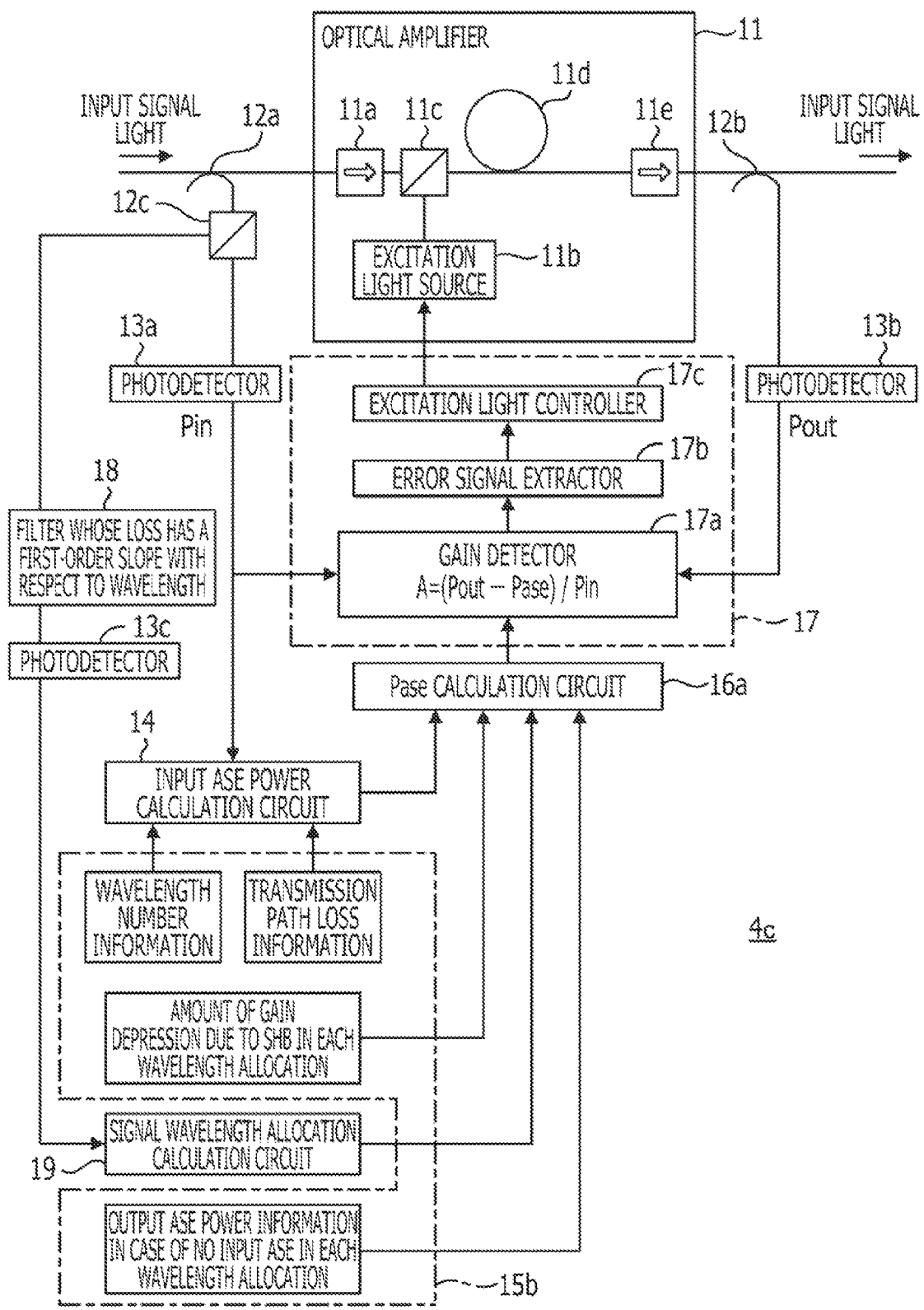
FIG. 21 illustrates a fourth embodiment of the optical amplifying device.

FIG. 21 is a diagram illustrating a fourth embodiment of the optical amplifying device 4-$i$ illustrated in FIG. 1. The amount of gain depression in a C band due to SHB varies depending on a wavelength to which a signal is allocated, as illustrated in FIG. 14 described above. On the other hand, an optical amplifying device 4$c$ exemplified in FIG. 21 calculates correction power that corresponds to signal wavelength allocation.

Namely, the optical amplifying device 4$c$ exemplified in FIG. 21 is different from the optical amplifying device 4 exemplified in FIG. 2, and includes an optical splitter 12$c$, an optical filter 18, a photodetector 13$c$, and a signal wavelength allocation calculation circuit 19 in order to calculate the wavelength allocation of input light. In addition, a correction power calculation circuit 16$a$ may calculate correction power that corresponds to the calculated signal wavelength allocation. In addition, in FIG. 21, the same symbol as that in FIG. 2 indicates almost the same portion.

Figure 22:
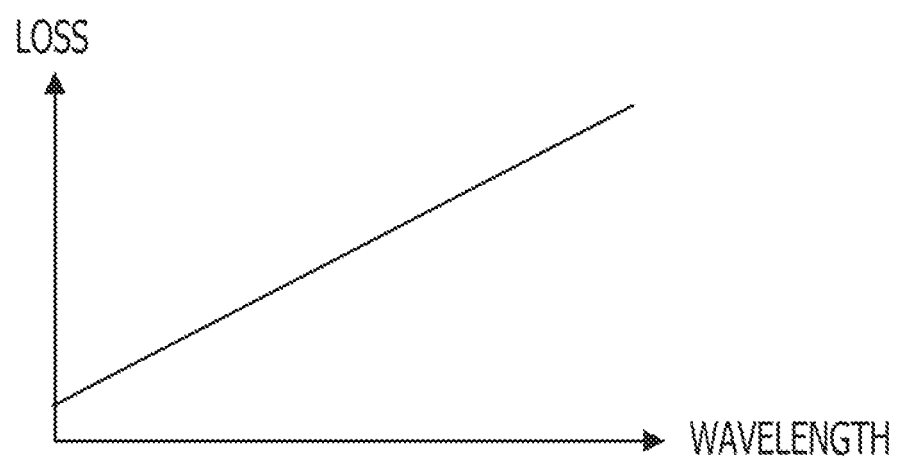
FIG. 22 illustrates an example of a loss characteristic added in an optical filter.
Figure 23:
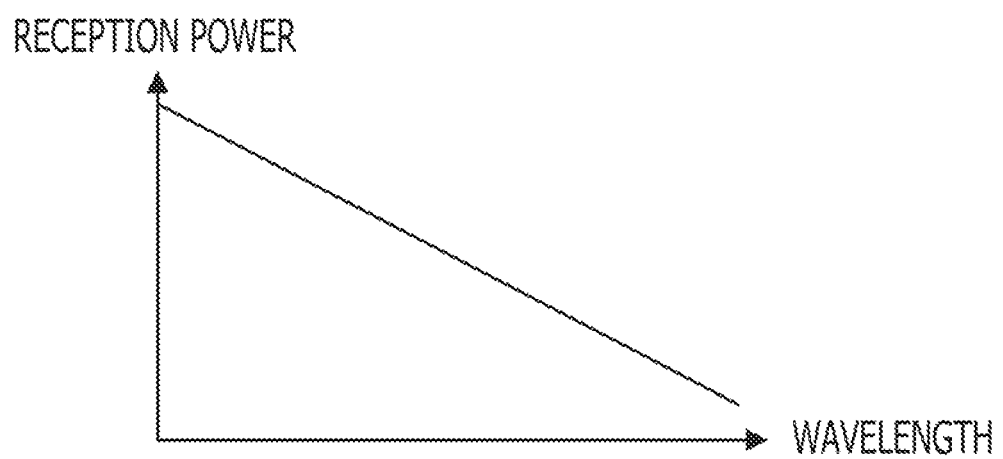
FIG. 23 illustrates an example of a relationship between an assigned signal wavelength and reception power detected in a photodetector.

The optical splitter 12$c$ further branches input light branched at an optical splitter 12$a$, and outputs the branched input light to the photodetector 13$a$ and the optical filter 18, which are the same as those illustrated in FIG. 2. The optical filter 18 adds a loss characteristic exemplified in FIG. 22 to input light from the optical splitter 12$c$, and outputs the input light. With respect to the loss characteristic of the optical filter 18, the wavelength characteristic thereof has a first-order slope characteristic in an amplification band (or signal wavelength band) of the EDF 11$d$. For example, it is assumed that a loss has a first-order slope ranging from a wavelength (for example, a short-wavelength in the C band) in which gain depression is large to a wavelength (for example, a long-wavelength band in the C band) in which gain depression is small, and increases with increase in wavelength.

At this time, when a signal wavelength is assigned to one wave, the effect of ASE correction (namely, the correction of a signal gain value derived at the time of constant gain control, which is coupled with the ASE component) is large. Focusing on the case of the wavelength allocation of one wave, a relationship between the assigned signal wavelength and reception power detected in the photodetector 13$c$ is a relationship in which the signal wavelength and the reception power may be associated with each other on a one-to-one basis. In other words, in the signal wavelength allocation calculation circuit 19, the signal wavelength allocation may be derived on the basis of the reception power detected in the photodetector 13$c$.

Accordingly, the optical filter 18 turns out to be an optical filter for converting the input light into light that has optical power based on the wavelength allocation. In addition, the photodetector 13$c$ detects the optical power of the light output from the above-mentioned optical filter 18.

An input to the signal wavelength allocation calculation circuit 19 is light that passes through the optical filter 18 having the first-order slope characteristic, and turns out to have optical power based on the wavelength allocation. Accordingly, in the signal wavelength allocation calculation circuit 19, the signal wavelength allocation of input light may be calculated on the basis of the value of optical power that is the detection result from the photodetector 13$c$. The calculation result of the signal wavelength allocation in the signal wavelength allocation calculation circuit 19 is output to the correction power calculation circuit 16$a$.

In addition, the form illustrated in FIG. 21 is just an example as the configuration for calculating the signal wavelength allocation, and the signal wavelength allocation may be calculated using another method. For example, instead of using the optical filter 18, the photodetector 13$c$, and the like, the wavelength allocation information may be attached, as the information of signal wavelength allocation, to a monitoring signal from a device located upstream of a transmission path, and may be acquired.

In addition to the wavelength number information n and the transmission path loss information Loss, which are the same pieces of information as those in the case illustrated in FIG. 2, information ΔG relating to the amount of gain depression due to SHB in each wavelength allocation is also stored in the memory 15$b$. Furthermore, the information Pase 0 of output ASE power that corresponds to the signal wavelength allocation when there is no ASE in an input is also stored in the memory 15$b$.

Figure 24:
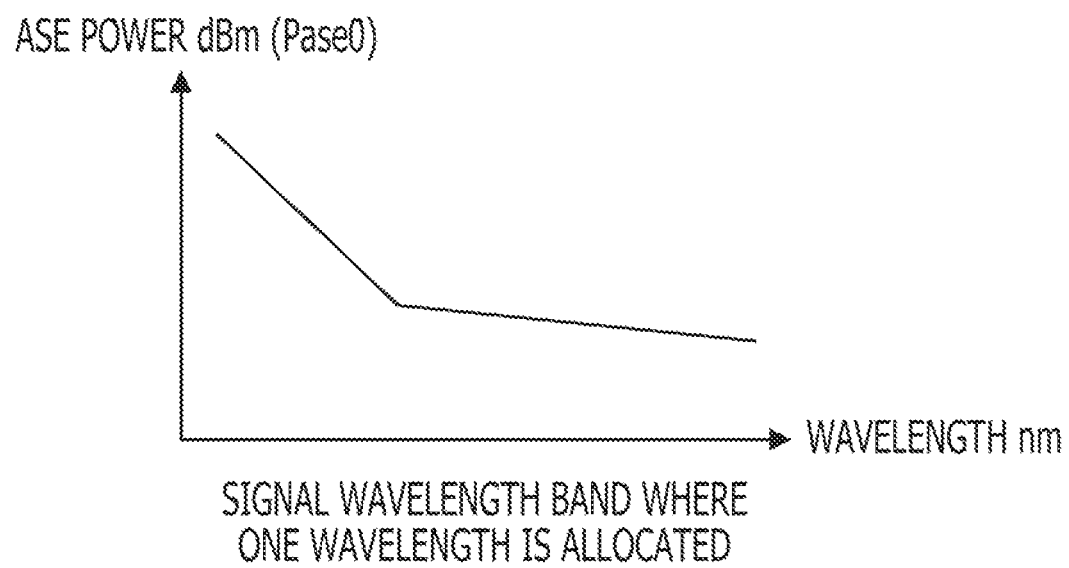
FIG. 24 illustrates an example of information of output ASE power that corresponds to signal wavelength allocation when there is no ASE in an input in a case in which signal wavelength allocation corresponds to one wavelength.

With respect to the information of Pase 0 of each wavelength allocation, information obtained by preliminarily measuring Pase 0 is stored in the memory 15b. As described above, when there is SHB in the signal wavelength band, the ASE power increases. Therefore, as exemplified in FIG. 24, when a signal wavelength is allocated (for example, as one wavelength) on a shorter-wavelength side in which SHB is large, the Pase 0 becomes larger. On the other hand, when a signal wavelength is allocated on a longer-wavelength side, the Pase 0 becomes smaller.

In addition, in the correction power calculation circuit 16a, information ΔG relating to the amount of gain depression due to SHB according to wavelength allocation calculated in the signal wavelength allocation calculation circuit 19. In other words, the correction power calculation circuit 16a is an SHB gain depression amount calculator that calculates the amount of gain depression in a band in which spectral hole-burning occurs in the optical amplifier 11, in accordance with wavelength allocation.

Furthermore, the correction power calculation circuit 16a extracts, along with the information of Pase 0, the wavelength number information n and the information Loss of transmission path loss from the memory 15b. Furthermore, the correction power calculation circuit 16a receives the calculation result Pin_ase from the input ASE power calculation circuit 14. Accordingly, in the correction power calculation circuit 16a, the correction power Pase is calculated in accordance with Expression (4) described above.

Namely, in the correction power calculation circuit 16a, using the information ΔG relating to the calculated amount of gain depression due to SHB, the correction power Pase may be calculated that includes, as a component, the amount of gain depression due to SHB according to wavelength allocation.

In the controller 17, in the same way as in FIG. 2 or the like described above, constant gain control is performed for the optical amplifier 11, using the Pase calculated in the correction power calculation circuit 16a. At this time, in the optical amplifying device 4c illustrated in FIG. 21, compared with the optical amplifying device illustrated in FIG. 2 described above, since the correction power Pase is used that includes, as a component, the amount of gain depression due to SHB according to wavelength allocation, the accuracy of the constant gain control for the signal light may be improved.

Figure 25:
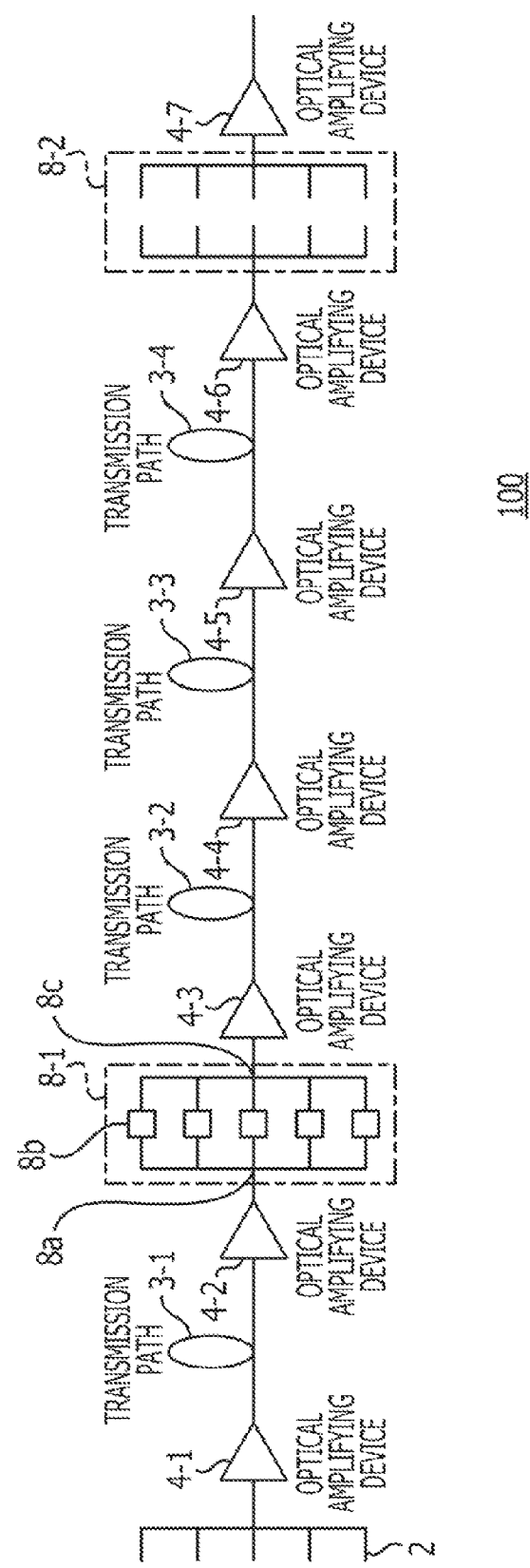
FIG. 25 illustrates an optical communication system in another embodiment.

FIG. 25 is a diagram exemplifying an optical communication system 100 in another embodiment. In the optical communication system 100 exemplified in FIG. 25, unlike the optical communication system illustrated in FIG. 1, optical transmission devices 8-1 and 8-2 that have optical add-drop (OADM) functions are inserted and disposed. In the optical communication system 100, in the same way as in the optical communication system illustrated in FIG. 1, a multiplexer 2 disposed at a transmitting end wavelength-multiplexes and outputs optical signals that have a plurality of wavelengths, and the output wavelength-multiplexed optical signal is propagated through a transmission path 3.

The optical transmission path 3 is connected through an optical amplifying device 4. In FIG. 25, an optical transmission path between optical amplifying devices 4-1 and 4-2 is indicated as an optical transmission path 3-1, an optical transmission path between optical amplifying devices 4-3 and 4-4 is indicated as an optical transmission path 3-2, an optical transmission path between optical amplifying devices 4-4 and 4-5 is indicated as an optical transmission path 3-3, and an optical transmission path between optical amplifying devices 4-5 and 4-6 is indicated as an optical transmission path 3-4.

In addition, the optical transmission device 8-1 is inserted and disposed between the optical amplifying devices 4-2 and 4-3, and the optical transmission device 8-2 is inserted and disposed between the optical amplifying devices 4-6 and 4-7. For example, a wavelength-multiplexed optical signal the loss in the transmission path 3-1 of which is compensated in the optical amplifying device 4-2 is input to the optical transmission device 8-1. In the optical transmission device 8-1, a demultiplexer 8a such as arrayed waveguide gratings (AWG) or the like demultiplexes the input wavelength-multiplexed optical signal into optical signals that correspond to individual wavelengths, and a switch 8b performs an add-drop operation on the optical signals in units of wavelengths as necessary. In addition, a multiplexer 8c such as AWG or the like multiplexes again the optical signals that are output from the switch 8b and correspond to individual wavelengths.

The optical transmission device 8-1 outputs the wavelength-multiplexed optical signal that is subjected to multiplexing and supplied from the multiplexer 8c. In addition, the optical amplifying device 4-3 compensates losses that occur in the wavelength-multiplexed optical signal from the optical transmission device 8-1 owing to demultiplexing and multiplexing performed in the demultiplexer 8a and the multiplexer 8c in the optical transmission device 8-1, respectively, and outputs the wavelength-multiplexed optical signal to the subsequent stage transmission path 3-2.

For example, it is assumed that optical signals that have the shortest wavelength and the longest wavelength in an optical signal wavelength band are transmitted from a transmitting end. In addition, it is assumed that, while the optical signal that corresponds to the longest wavelength is dropped, the optical signal that corresponds to the shortest wavelength is transmitted to the optical transmission device 8-2 side. In this case, while the optical signal that corresponds to the longest wavelength is dropped in the switch 8b in the optical transmission device 8-1, the optical signal that corresponds to the shortest wavelength is output to the optical amplifying device 4-3 side through the multiplexer 8c.

Figure 26:
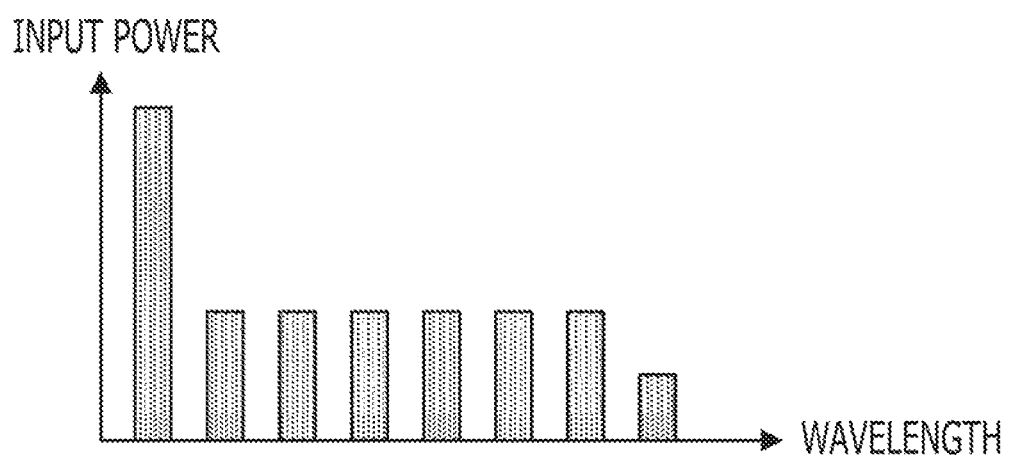
FIG. 26 illustrates an example of a wavelength characteristic of power of an optical signal input to an optical amplifying device.

If such an optical signal that corresponds to the shortest wavelength is output from the optical transmission device 8-1 and input to the optical amplifying device 4-7 through the transmission paths 3-2 to 3-4, the optical amplifying devices 4-3 to 4-6, and the optical transmission device 8-2, the wavelength characteristic of optical signal power at this time may become as exemplified in FIG. 26. Here, the reason why, in response to the transition of a wavelength band from a short-wavelength side to a long-wavelength side, the optical power does not vary continuously but a comb-shaped spectrum occurs is because losses occurs when the optical signal passes through AWGs included in the demultiplexer 8a, the multiplexer 8c, and the like in the optical transmission device 8-1.

In addition, as exemplified in FIG. 26, the reason why the shortest wavelength has a higher power than other wavelength bands is because there is the optical signal therein. In addition, the reason why the longest wavelength has a lower power than other wavelength bands is because the optical signal is dropped once in the optical transmission device 8-1 and hence ASE generated in the optical amplifying device 4-1 and the optical amplifying device 4-2 does not reach the optical amplifying device 4-7.

In this way, in the OADM system, ASE power input to the optical amplifying device 4 may have a complex form. In this case, when correction power used for constant gain control performed in the optical amplifying device 4 in each embodiment described above is calculated, it is used to derive the ASE light power included in the input light with a high degree of accuracy.

Figure 27:
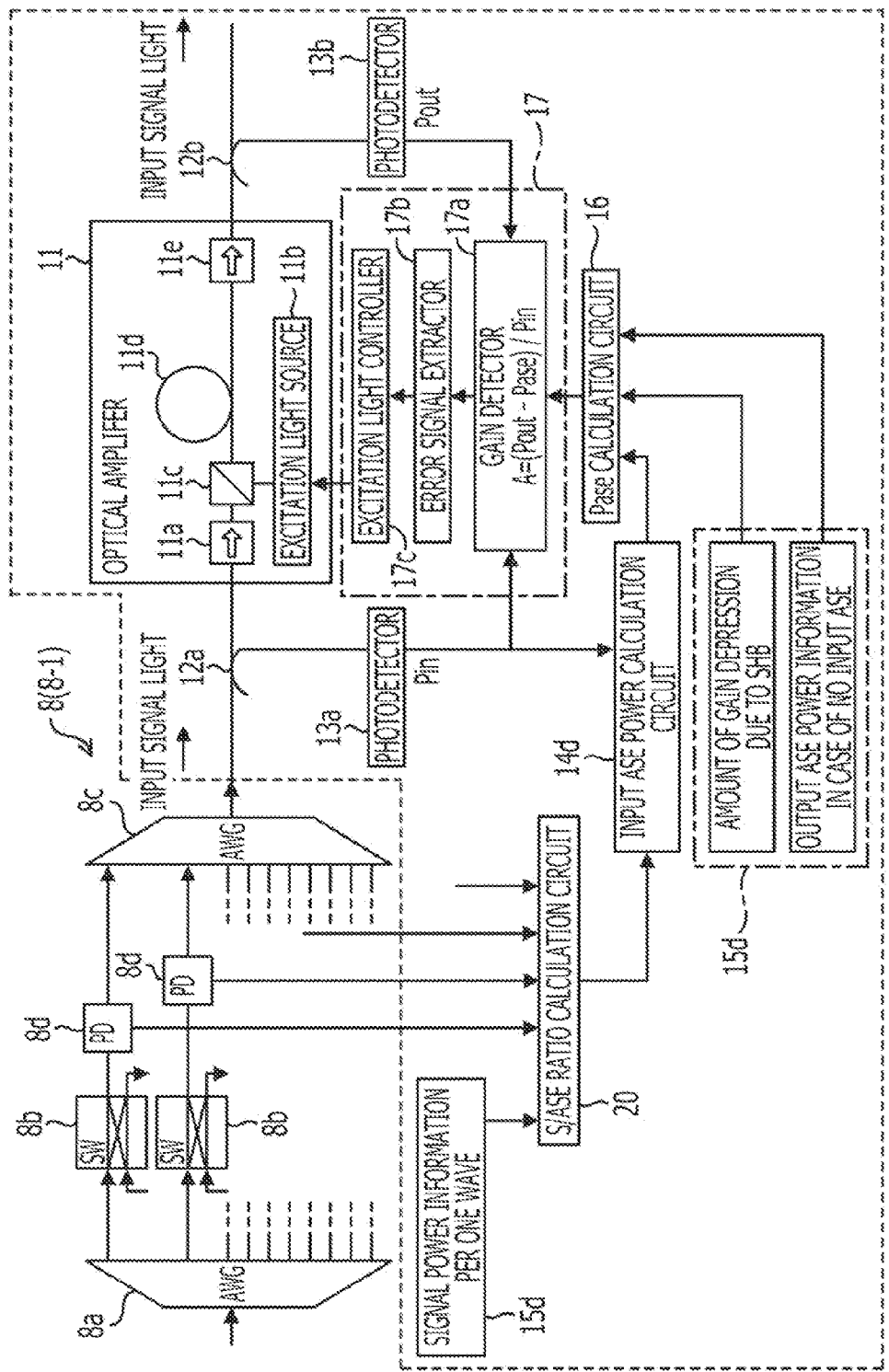
FIG. 27 illustrates an optical amplifying device applied to an OADM system.

FIG. 27 is a diagram exemplifying an optical amplifying device 4d applied to the OADM system. With respect to the following description of the optical amplifying device 4d, it is assumed that, for example, the optical amplifying device 4d is used as the optical amplifying device 4-3 in the OADM system 100 exemplified in FIG. 25. In addition, the optical amplifying device 4d may also be applied to another optical amplifying device 4-i.

In the optical transmission device 8-1, on an optical directional path of each channel demultiplexed in a demultiplexer 8a that is an AWG, a photo detector (PD) 8d is disposed in addition to a switch 8b. Each switch 8b selectively connects each wavelength-unit output (channel-unit output) from the demultiplexer 8a to a drop directional path under control of the switch 8b, and connects one of the outputs of the demultiplexer 8a and the drop directional path under control of the switch 8b to the multiplexer 8c. In addition, each PD 8d detects the power of the wavelength-unit optical signal that is output from the switch 8b and input to the multiplexer 8c.

When signal light is input to the PD 8d, the power of the signal light may be assumed to be a nearly standardized value. This is because, even if the signal light is amplified in the optical amplifying device 4-2 and passes through the demultiplexer 8a and the switch 8b, or the signal light is added through the switch 8b, the signal light may be thought to be signal light that has almost the same optical power as a predetermined value.

Here, in the optical amplifying device 4d, the calculation form in an input ASE power calculation circuit 14d is different from that in the optical amplifying device illustrated in FIG. 2. Accordingly, in the input ASE power calculation circuit 14d, the wavelength number information n and the transmission path loss information Loss, which are used in the case in FIG. 2, are not exactly necessary for the calculation of the ASE power. Accordingly, the storage of these pieces of information in the memory 15d may be omitted. In addition, other elements are the same as those illustrated in FIG. 2, and, in FIG. 27, the same symbol as that in FIG. 2 indicates almost the same portion.

In addition, the optical amplifying device 4d includes an S/ASE ratio calculation circuit 20 that calculates a ratio (S/ASE ratio) between signal light power and ASE light power in units of wavelengths. The memory 15d stores therein the information of the signal light power to be included in the input signal light. Namely, the S/ASE ratio calculation circuit 20 imports the detection result of the optical power of an output from the switch 8b in units of wavelengths.

In addition, in the S/ASE ratio calculation circuit 20, a channel that includes the signal light is derived from each detection result from the PD 8d, and the S/ASE ratio is calculated for the light of the derived channel. At this time, while the signal light and the ASE light are identified at the time of the calculation of the S/ASE ratio, a method described in Japanese Laid-open Patent Publication No. 2007-274545 may be used for the identification, for example.

In the S/ASE ratio calculation circuit 20, a channel that includes the signal light is derived from each detection result from the PD 8d on the basis of the information of the signal light power obtained from the memory 15d. For example, while a channel whose optical power is less than 3 dB is identified as a channel that includes ASE light and no signal light component, a channel whose optical power is greater than or equal to 3 dB is identified as a channel that includes signal light, thereby calculating the S/ASE ratio described above.

In the input ASE power calculation circuit 14d, using the S/ASE ratio from the S/ASE ratio calculation circuit 20 and input light power Pin_total detected in the photodetector 13a, the input ASE power Pin_ase is calculated in accordance with Expression (8) as follows.

$$Pin\_ase[dBm] = Pin\_total * \{ASE/(S+ASE)\} \quad (8)$$
$$= Pin\_total * \{1/(S/ASE + 1)\}$$

In the correction power calculation circuit 16, using the input ASE power Pin_ase calculated in this way, the correction power Pase is calculated in the same way as in the above-mentioned correction power calculation circuit illustrated in FIG. 2. Accordingly, in the gain controller 17, using the correction power Pase calculated in the correction power calculation circuit 16, the signal gain A relating to gain control performed in the optical amplifier 11 may be calculated, for example, in accordance with Expression (1) described above. In addition, using the information of the signal gain A derived with a high degree of accuracy, the controller 17 may control the optical amplifier 11 in the direction toward the target gain.

In this way, since the correction power calculated in the correction power calculation circuit 16 is used, the accuracy of the calculation of the signal gain in the optical amplifying device 4d illustrated in FIG. 27 may be improved in the same way as in FIG. 2, compared with a case in which the correction value Pase (corresponding to Pase 0) illustrated in FIG. 3 is used.

In addition, in the above-mentioned optical amplifying device illustrated in FIG. 27, the optical amplifying device 4d is adapted to include an S/ASE calculation circuit 19, and the information of signal light power per one wave is adapted to be stored in the memory 15d. However, the optical amplifying device is not limited to the form but the above-mentioned configuration may be provided outside an optical amplifying device, for example, in the optical transmission device 8-1 that is an OADM node, or the like. In addition, an optical transmission device may include a configuration in which the configuration of the above-mentioned OADM node 8 is combined with the configuration of the optical amplifying device.

Figure 28:
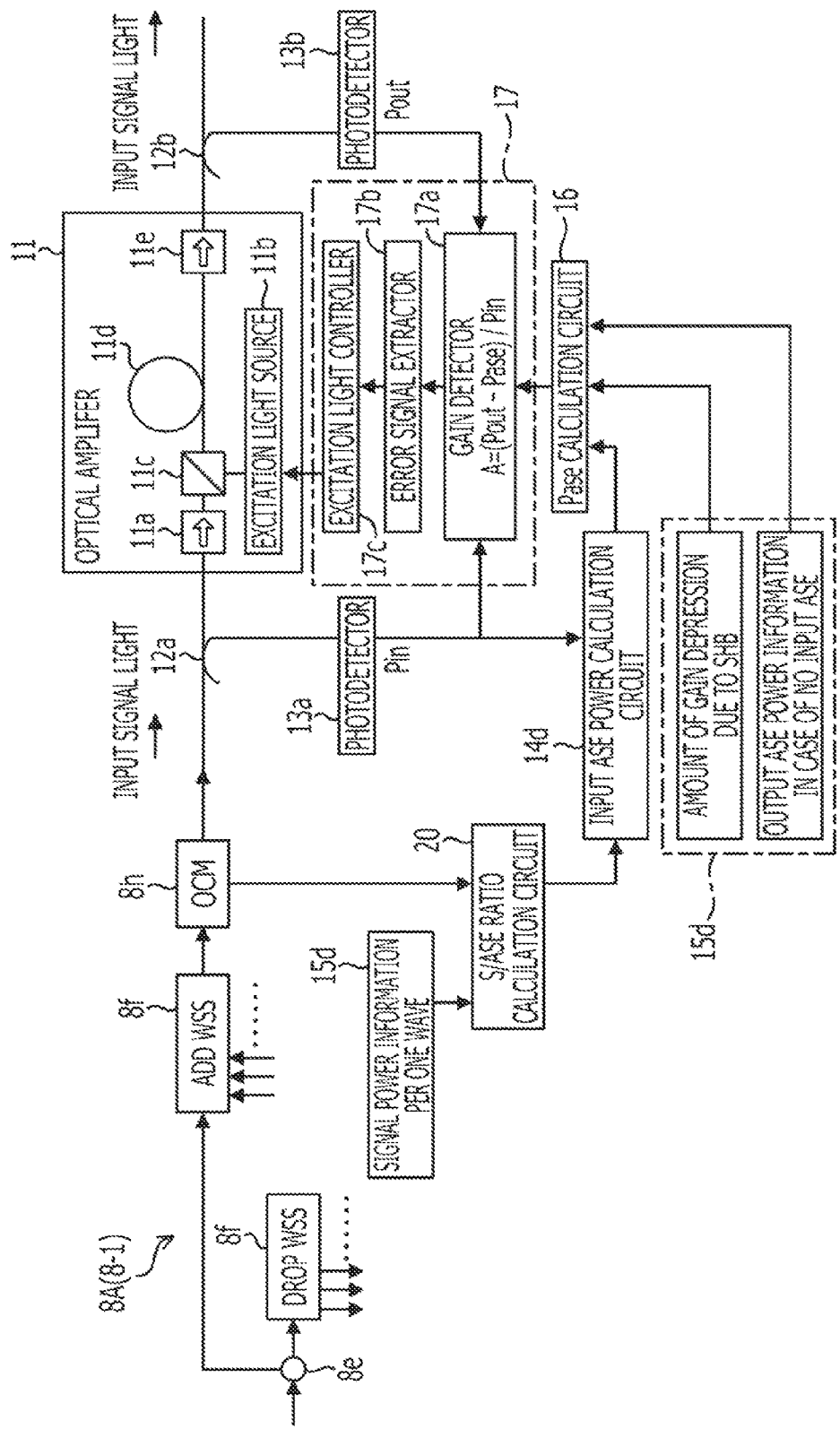
FIG. 28 illustrates an optical amplifying device applied to an OADM system.

FIG. 28 is an example in which an optical transmission device 8A having a configuration different from that in FIG. 27 is applied. It is assumed that the optical amplifying device 8d is basically the same as that illustrated in FIG. 27. With respect to the following description of the optical transmission device 8A, it is assumed that, as an example, the optical transmission device 8A is used as the optical transmission device 8-1 in the OADM system 100 exemplified in FIG. 25. In addition, in FIG. 28, the same symbol as that in FIG. 27 indicates almost the same portion.

The optical transmission device 8A exemplified in FIG. 28 realizes an OADM function using a wavelength selective switch (WSS). With respect to signal light, the WSS switches an optical directional path between arbitrary ports in units of wavelengths.

Here, the optical transmission device 8A includes an optical coupler 8e that separates input light into two branches, two WSSs 8f and 8g that introduce, as inputs, two beams of light form optical directional paths into which an optical path is two-branched in the optical coupler 8e, respectively, and an optical channel monitor (OCM) 8h.

In the WSS 8f, one input port is a feed port for an optical directional path from the optical coupler 8e, the other input port is a feed port for an optical directional path in which light is added, and light from each input port is selected with respect to each wavelength and led to an output port. The light led from the output port is output to a subsequent stage optical amplifying device 4-3 through the OCM 8h. In addition, the number of feed ports for optical directional paths in which light is added is not specifically limited but the number may be one or more than one.

In the WSS 8g, one input port is a feed port for an optical directional path from the optical coupler 8e, and light selected as a dropped wavelength is led through an output port to a directional path in which light is dropped. The number of output ports led to directional paths in which light is dropped is also not specifically limited but the number may be one or more than one.

The OCM 8h monitors the optical power of light led from the WSS 8f to the optical amplifying device 4e (refer to the symbol 4-3 in FIG. 25), with respect to each wavelength (with respect to each channel). In addition, the information of power monitored in the OCM 8h with respect to each wavelength is output to the S/ASE ratio calculation circuit 20.

In the S/ASE ratio calculation circuit 20, using the information from the OCM 8h, a channel that includes the signal light is derived, and the S/ASE ratio is calculated for the light of the derived channel. Except for the use of the information from the OCM 8h, a calculation form for the S/ASE ratio is the same as that in FIG. 27.

Accordingly, in the same way as in FIG. 27, in the input ASE power calculation circuit 14d, using the S/ASE ratio from the S/ASE ratio calculation circuit 20 and input light power Pin_total detected in the photodetector 13a, the input ASE power Pin_ase may be calculated. In addition, in the correction power calculation circuit 16, using the input ASE power Pin_ase calculated in this way, the correction power Pase may be calculated.

Accordingly, in the gain controller 17, using the correction power Pase calculated in the correction power calculation circuit 16, the signal gain A relating to gain control performed in the optical amplifier 11 may be calculated with a high degree of accuracy. In addition, using the information of the signal gain A derived with a high degree of accuracy, the controller 17 may control the optical amplifier 11 in the direction toward the target gain.

According to the embodiments described above, since the amount of gain depression due to the SHB the effect of which differs in response to ASE included in the input light is incorporated into elements for the constant gain control, the accuracy of the calculation of a signal gain and the constant gain control may be improved.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. An optical amplifying device comprising:
   an optical amplifier configured to perform optical amplification for gain by controlling so as to be a target gain;
   a correction power calculator configured to calculate, in response to amplified spontaneous emission light input to the optical amplifier, correction power corresponding to an amount of gain depression in a bandwidth in which spectral hole-burning occurs in the optical amplifier; and
   a gain controller configured to calculate, using the correction power calculated in the correction power calculator, a gain for controlling the optical amplification performed in the optical amplifier and perform, using the calculated gain, a control operation so that the gain of the optical amplification becomes the target gain.

2. The optical amplifying device according to claim 1, wherein
   the correction power calculator calculates the correction power based on power of the amplified spontaneous emission light included in input light to the optical amplifier, the amount of gain depression in the bandwidth in which the spectral hole-burning occurs in the optical amplifier, and power of amplified spontaneous emission light that occurs in the amplifier when there is no amplified spontaneous emission light in an input.

3. The optical amplifying device according to claim 1, wherein
   the gain controller subtracts the correction power calculated in the correction power calculator from output light power of the optical amplifier, and calculates the gain using the subtraction result and power information of input light to the optical amplifier.

4. The optical amplifying device according to claim 2, further comprising:
   an input amplified spontaneous emission (ASE) power calculator configured to calculate the power of the amplified spontaneous emission light included in input light to the optical amplifier; and
   a memory configured to store information used for a calculation processing operation performed in the correction power calculator, wherein
   the correction power calculator uses, for the calculation of the correction power, the calculation result of the input ASE power calculator and the information stored in the memory.

5. The optical amplifying device according to claim 4, wherein
   the memory stores information of the amount of gain depression in the bandwidth in which the spectral hole-burning occurs in the optical amplifier and information of the power of the amplified spontaneous emission light that occurs in the amplifier when there is no amplified spontaneous emission light in the input.

6. The optical amplifying device according to claim 4, further comprising:
   an SHB gain depression amount calculator configured to calculate the amount of gain depression in the bandwidth in which the spectral hole-burning occurs in the optical amplifier, in accordance with signal wavelength allocation, wherein
   the memory stores information of the power of the amplified spontaneous emission light that occurs in the amplifier when there is no amplified spontaneous emission light in the input, and
   the correction power calculator uses, for the calculation of the correction power, the calculation result of the SHB gain depression amount calculator and the information stored in the memory.

7. The optical amplifying device according to claim 4, wherein
   the optical amplifier amplifies, as the input light, light transmitted from another transmission device and input through a transmission path, and the input ASE power calculator calculates power of amplified spontaneous emission light included in the input light based on information of the number of wavelength-multiplexed channels of a signal light included in the light transmitted from the other transmission device, information of loss of the transmission path, and information of power of the input light or information of transmission power per unit channel in the wavelength-multiplexed channels.

8. The optical amplifying device according to claim 4, wherein
the optical amplifier amplifies, as the input light, light transmitted from another transmission device and input through a transmission path, and
the input ASE power calculator calculates power of amplified spontaneous emission light included in the input light based on information of amplified spontaneous emission light power included in the transmission light from the other transmission device, information of loss of the transmission path, and information of power of the input light.

9. The optical amplifying device according to claim 4, wherein
the optical amplifier amplifies, as the input light, light transmitted from another transmission device and input through a transmission path, and
the input ASE power calculator calculates power of amplified spontaneous emission light included in the input light based on information of a ratio between signal light power and amplified spontaneous emission light power with respect to each wavelength-multiplexed channel of signal light, which is included in the light transmitted from the other transmission device, and information of power of the input light.

10. The optical amplifying device according to claim 1, further comprising:
an input light power detector configured to detect power of the input light; and
an output light power detector configured to detect power of output light amplified in the optical amplifier and output, wherein
individual detection results of the input light power detector and the output light power detector are used for the gain calculation performed in the gain controller.

11. The optical amplifying device according to claim 1, wherein
the correction power is power of amplified spontaneous emission light generated in the optical amplifier, an increase in the level of the amplified spontaneous emission light input to and amplified in the optical amplifier being excluded from the power, the power being coupled with the amount of gain depression due to the spectral hole-burning that occurs in the optical amplifier in response to the amplified spontaneous emission light included input light to the optical amplifier.

12. A gain control method for an optical amplifying device that performs a control operation in which optical amplification is performed at a target gain, the gain control method comprising:
calculating correction power, based on power of amplified spontaneous emission light included in input light to an amplifier, an amount of gain depression in a bandwidth in which spectral hole-burning occurs in the optical amplifier, and power of amplified spontaneous emission light that occurs in the amplifier when there is no amplified spontaneous emission light in an input;
subtracting a value of the calculated correction power from a value of power of output light of the optical amplifier, and calculating a gain, using the subtraction result and a value of power of input light to the amplifier; and
performing, using the calculated gain, a control operation so that a gain of the optical amplification performed in the optical amplifier becomes the target gain.

13. An optical transmission device that uses the optical amplifying device according to claim 1.

14. A gain control device that controls, at a target gain, optical amplification performed in an optical amplifier, comprising:
a correction power calculator configured to calculate, in response to amplified spontaneous emission light input to the optical amplifier, correction power corresponding to an amount of gain depression in a bandwidth in which spectral hole-burning occurs in the optical amplifier; and
a gain controller configured to calculate, using the correction power calculated in the correction power calculator, a gain for controlling the optical amplification performed in the optical amplifier and perform, using the calculated gain, a control operation so that a gain of the optical amplification becomes the target gain.

* * * * *